(12) United States Patent
Terai

(10) Patent No.: US 7,894,863 B2
(45) Date of Patent: Feb. 22, 2011

(54) COMMUNICATION SYSTEM, COMMUNICATION APPARATUS, AND OPERATION CONTROL METHOD

(75) Inventor: Takao Terai, Kanagawa (JP)

(73) Assignee: Sony Corporation (JP)

(*) Notice: Subject to any disclaimer, the term of this patent is extended or adjusted under 35 U.S.C. 154(b) by 869 days.

(21) Appl. No.: 11/799,770

(22) Filed: May 3, 2007

(65) Prior Publication Data

US 2007/0275704 A1 Nov. 29, 2007

(30) Foreign Application Priority Data

May 11, 2006 (JP) ............................ P2006-132366

(51) Int. Cl.
*H04M 1/00* (2006.01)
(52) U.S. Cl. ................ 455/574; 455/127.5; 455/343.5; 381/74; 381/309; 381/77; 381/80; 381/81
(58) Field of Classification Search ................ 455/574, 455/127.5, 343.5; 381/74, 309, 77, 80, 81
See application file for complete search history.

(56) References Cited

U.S. PATENT DOCUMENTS

| 2001/0029196 | A1* | 10/2001 | Wakamatsu | ................ | 455/574 |
| 2002/0072818 | A1* | 6/2002 | Moon et al. | .................... | 700/94 |
| 2004/0106424 | A1* | 6/2004 | Yoshizawa | ................... | 455/522 |
| 2004/0122542 | A1* | 6/2004 | Yang | ........................... | 700/94 |
| 2004/0185821 | A1* | 9/2004 | Yuasa | ..................... | 455/343.5 |
| 2004/0266443 | A1 | 12/2004 | Ito | | |
| 2006/0121954 | A1* | 6/2006 | Mock | ......................... | 455/574 |

FOREIGN PATENT DOCUMENTS

| JP | 3-014346 A | 1/1991 |
| JP | 4-137925 A | 5/1992 |
| JP | 2001-245344 A | 9/2001 |
| JP | 2002-366264 A | 12/2002 |
| JP | 2003-087172 A | 3/2003 |

(Continued)

OTHER PUBLICATIONS

English Translation of Japanese Office Action issued on Jun. 23, 2009, issued in Japanese Patent Application No. 2006-132366.

(Continued)

*Primary Examiner*—Jinsong Hu
*Assistant Examiner*—Dung Hong
(74) *Attorney, Agent, or Firm*—Lerner, David, Littenberg, Krumholz & Mentlik, LLP

(57) ABSTRACT

Disclosed herein is a communication system including a signal output apparatus for outputting a stream signal, and first and second communication apparatuses for performing wireless communication. The first communication apparatus includes, a communication processing section configured to perform wireless communication of the stream signal over a stream line with the second communication apparatus, a signal input section configured to input the stream signal outputted from the signal output apparatus, a voltage detection section configured to detect a voltage at the signal output apparatus, and a control section configured to perform a streaming process of transmitting the stream signal inputted from the signal output apparatus via the signal input section to the second communication apparatus over the stream line, and also perform operation control based on a result of the detection by the voltage detection section.

21 Claims, 15 Drawing Sheets

FOREIGN PATENT DOCUMENTS

| | | |
|---|---|---|
| JP | 2003-153453 A | 5/2003 |
| JP | 2004-147266 A | 5/2004 |
| JP | 2005-026758 A | 1/2005 |
| JP | 2005-328368 A | 11/2005 |
| JP | 2005328368 A * | 11/2005 |
| WO | WO 2004075068 A1 * | 9/2004 |

OTHER PUBLICATIONS

Miyatsu, Kazuhiro, New Technology in Wireless Communication, Bluetooth Guidebook, Daily Industry Newspaper Publishing Company, Aug. 28, 2000, First Edition, pp. 153-164.

* cited by examiner

FIG.3D
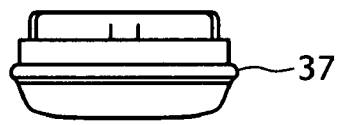
FIG.3B  FIG.3A  FIG.3C
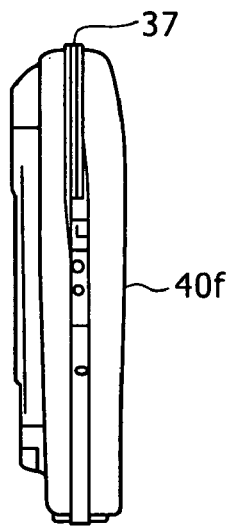 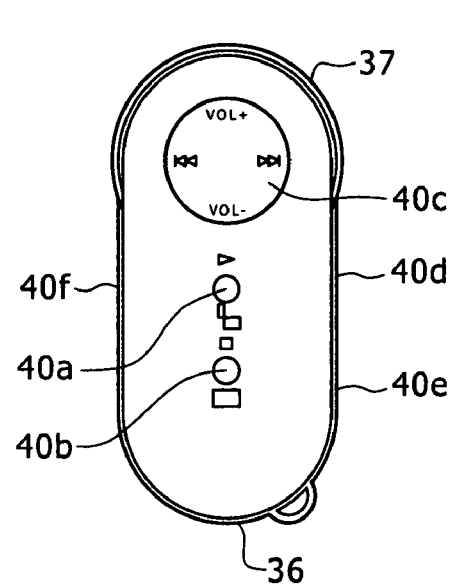 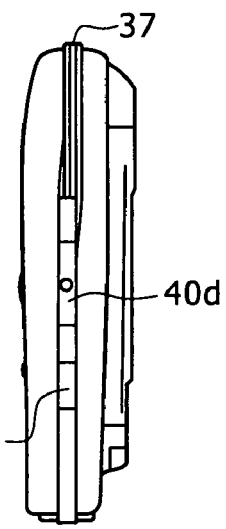
FIG.3E
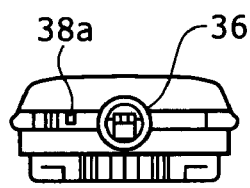

COMMUNICATION SYSTEM, COMMUNICATION APPARATUS, AND OPERATION CONTROL METHOD

CROSS REFERENCES TO RELATED APPLICATIONS

The present application claims priority from Japanese Patent Application No. JP 2006-132366, filed in the Japanese Patent Office on May 11, 2006, the entire content of which is incorporated herein by reference.

BACKGROUND OF THE INVENTION

1. Field of the Invention

The present invention relates to a communication system, a communication apparatus, and a method for controlling an operation of a communication apparatus, and is suitably applied to a Bluetooth communication device, for example.

2. Description of the Related Art

Japanese Patent Laid-open No. 2005-26758 is an example of related art.

An electronics system using short-range wireless communication according to a Bluetooth system or the like has already been developed. For example, information processing devices (e.g., personal computers, personal digital assistants (PDAs), etc.) and devices such as mobile phones are sometimes equipped with a short-range wireless communication unit.

Bluetooth is a standard that uses the 2.4 GHz band to allow wireless communication between devices placed within a radius of approximately 10 to 100 meters. Bluetooth is used for various types of data communication between various devices possessed by a user, for example.

SUMMARY OF THE INVENTION

The Bluetooth communication can also be used for communication of a stream signal such as an audio signal, a video signal, etc. Therefore, if a portable audio player is connected to a Bluetooth communication unit and headphones are provided with a Bluetooth communication unit, for example, an audio stream signal reproduced in the portable audio player can be transferred to the headphones in a wireless manner by the Bluetooth communication to allow sound based on the audio stream signal to be outputted via the headphones.

Use of such a system enables a user to enjoy music or the like while the portable audio player and the headphones are connected to each other in a wireless manner.

Commercialization of such a system needs elimination of wasteful operations and wasteful power consumption in each device and realization of more comfortable convenience for the user, for example. As such, an advantage of the present invention lies in achieving the elimination of the wasteful operations and power consumption in each device and achieving improved convenience.

According to one embodiment of the present invention, there is provided a communication system, including, a signal output apparatus for outputting a stream signal, and first and second communication apparatuses for performing wireless communication, wherein the first communication apparatus includes, a communication processing section configured to perform wireless communication of the stream signal over a stream line with the second communication apparatus, a signal input section configured to input the stream signal outputted from the signal output apparatus, a voltage detection section configured to detect a voltage at the signal output apparatus, and a control section configured to perform a streaming process of transmitting the stream signal inputted from the signal output apparatus via the signal input section to the second communication apparatus over the stream line, and also perform operation control based on a result of the detection by the voltage detection section.

According to another embodiment of the present invention, there is provided a communication apparatus, including, a communication processing section configured to perform wireless communication of a stream signal over a stream line with another communication apparatus, a signal input section configured to input the stream signal outputted from a connected signal output apparatus, a voltage detection section configured to detect a voltage at the signal output apparatus, and a control section configured to perform a streaming process of transmitting the stream signal inputted from the signal output apparatus via the signal input section to the other communication apparatus over the stream line, and also perform operation control based on a result of the detection by the voltage detection section.

According to yet another embodiment of the present invention, there is provided a method for controlling an operation of a communication apparatus including, a communication processing section configured to perform wireless communication of a stream signal over a stream line and wireless communication of control data over a control line with another communication apparatus, a signal input section configured to input the stream signal outputted from a connected signal output apparatus, and a terminal voltage detection section configured to detect a voltage at a power supply terminal provided in the signal output apparatus to supply power to an external device, wherein, if the voltage detected by the terminal voltage detection section has risen above a predetermined value when an operating state is a power saving mode, the operating state is switched to a normal mode, and a streaming process of transmitting the stream signal inputted from the signal output apparatus via the signal input section to the other communication apparatus over the stream line is started, and if the voltage detected by the terminal voltage detection section has fallen below the predetermined value while the streaming process is being performed, the streaming process is terminated and the operating state is switched to the power saving mode.

The stream line is, for example, a communication line that uses a profile for transferring the stream signal, such as A2DP (Advanced Audio Distribution Profile) or VDP (Video Distribution Profile) in Bluetooth communication. A control line is, for example, a communication line for transferring a control command, such as AVDTP (Audio/Video Distribution Transport Protocol) used in conjunction with the A2DP or the VDP.

According to the above-described embodiments of the present invention, the communication apparatus (i.e., the first communication apparatus) uses the terminal voltage detection section to detect the voltage at the power supply terminal provided in the signal output apparatus to supply power to an external device and thereby detect the operating state (i.e., the power state) of the connected signal output apparatus, and the first communication apparatus accordingly performs an appropriate control process. For example, the first communication apparatus performs the starting or terminating of the streaming process, the switching of the operating state between the normal mode and the power saving mode, and the like. In other words, depending on whether the signal output apparatus is currently outputting the stream signal or whether the signal output apparatus is currently incapable of outputting the stream signal, the first communication apparatus is able to control the streaming process appropriately and perform appropriate mode control. Thus, wasteful power consumption caused by useless operation in the communication apparatus can be avoided. Moreover, a user is relieved of the need to worry about wasteful power consumption.

Further, when starting or terminating the streaming process, the communication apparatus (i.e., the first communication apparatus) notifies another communication apparatus (i.e., the second communication apparatus) of the start or termination of the streaming process. This enables the other communication apparatus to enter an appropriate operating state accordingly. Thus, comfortable and efficient system operation is realized.

BRIEF DESCRIPTION OF THE DRAWINGS

FIGS. 3A to 3E illustrate an appearance of a BT receiver according to this embodiment;

DETAILED DESCRIPTION OF THE PREFERRED EMBODIMENTS

Hereinafter, an embodiment of the present invention will be described. Specifically, a system in which Bluetooth communication units are used between an audio player and headphones so that music or the like played by the audio player can be enjoyed via the headphones using wireless connection will now be described below. The description will be made in the following order:

1. System configuration;
2. Internal structure of BT adapter;
3. Internal structure of BT receiver;
4. Internal structure of audio player;
5. Procedure performed by BT adapter;
6. Procedure performed by BT receiver;
7. Exemplary operations; and
8. Effects of embodiment.

1. System Configuration

Figure 1:
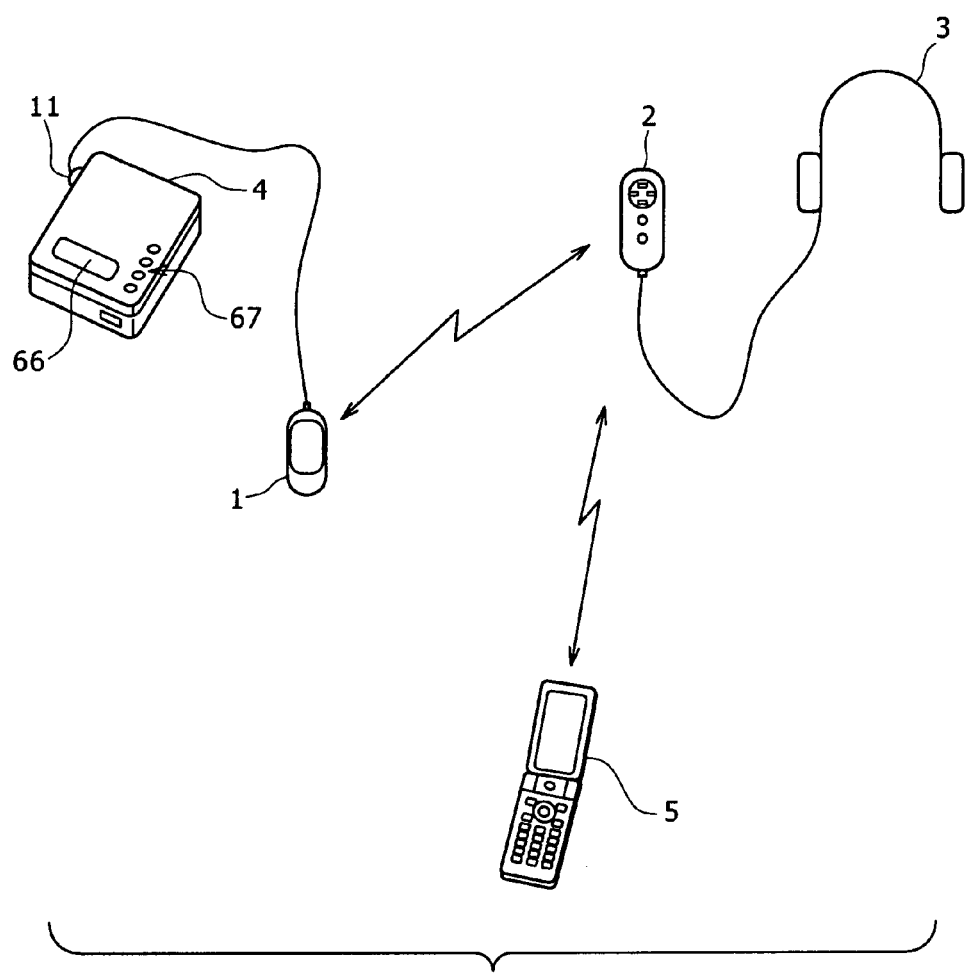
FIG. 1 is an illustration of a communication system according to one embodiment of the present invention.

FIG. 1 illustrates a communication system according to this embodiment of the present invention. This communication system includes Bluetooth communication units 1 and 2, headphones 3, an audio player 4, and a mobile phone 5.

The Bluetooth communication units 1 and 2 perform Bluetooth communication with each other. Hereinafter, in order to distinguish the Bluetooth communication units 1 and 2 from each other for ease of description, the Bluetooth communication unit 1 will be referred to as a "BT adapter" and the Bluetooth communication unit 2 as a "BT receiver".

The audio player 4 is a portable music player, for example, which reproduces an audio stream signal of a musical piece or the like from a disk medium such as a compact disc (CD), a MiniDisc, or the like. Naturally, the audio player 4 may be a player that uses a removable memory card, a built-in solid-state memory (flash memory), or a hard disc drive (HDD) as a storage medium.

The audio player 4 is a device of a small size and light in weight, and thus easily carried by a user. The audio player 4 has a display section 66 and various operation keys 67, for example.

The BT adapter 1 is connected to the audio player 4, and transmits to the BT receiver 2 the audio stream signal which is reproduced and outputted from the audio player 4. That is, the BT adapter 1 is an adapter to be connected to the audio player 4, which does not have a Bluetooth communication capability, in order to transmit an audio signal in a wireless manner.

The BT receiver 2 is connected to the headphones 3. The BT receiver 2 is a unit for receiving the audio stream signal transmitted from the BT adapter 1 to output sound based on the audio stream signal via the headphones 3. The BT receiver 2 also functions as an operation unit to be used by the user to operate the audio player 4.

Note that, although the BT receiver 2 and the headphones 3 are separate devices in the present embodiment, the headphones 3 may be configured to have a communication capability that is realized by the BT receiver 2.

In such a system, the user connects the BT adapter 1 to the audio player 4 and connects the BT receiver 2 to the headphones 3, for example. Then, by wearing the headphones 3, the user is able to listen to the music or the like played by the audio player 4 via the headphones 3. This is achieved by wireless communication according to the Bluetooth.

In addition, the BT receiver 2 is capable of performing the Bluetooth communication with the mobile phone 5. This enables the user to wear the headphones 3 and make a telephone conversation without holding the mobile phone 5 by hand. A microphone used for the telephone conversation is provided on the BT receiver 2.

In short, when the user is carrying the audio player 4 or the mobile phone 5 in a bag or the like or has the audio player 4 or the mobile phone 5 near at hand, the user is able to enjoy the music played by the audio player 4 or make a telephone conversation by wearing the headphones 3 and operating the audio player 4 or the mobile phone 5 via the BT receiver 2.

The BT adapter 1 and the BT receiver 2 uses, for example, A2DP and AVDTP for the communication of the audio stream signal.

In the Bluetooth system, various profiles for transmitting audio/video stream signals are defined as so-called AV profiles. Being one of such profiles, the A2DP is regarded as a profile for transmitting high-quality audio data. For example, the A2DP transmits data over ACL (Asynchronous Connection-Less Link: packet-switched connection) instead of using SCO (Synchronous Connection-Oriented Link: circuit-switched connection), and uses the AVDTP, which is a protocol used for transferring AV data. In the BT adapter 1 and the BT receiver 2 according to the present embodiment, the A2DP and the AVDTP are used for a stream line and a control line, respectively.

Meanwhile, the SCO is used to transfer audio data between the BT receiver 2 and the mobile phone 5. Profiles used therefor are HSP (Headset Profile) and HFP (Hands Free Profile).

In addition, the BT adapter 1 and the BT receiver 2 use AVRCP (Audio/Video Remote Control Profile), which is a profile for realizing an AV remote control function on the Bluetooth, to communicate a command signal therebetween.

Figure 2C:
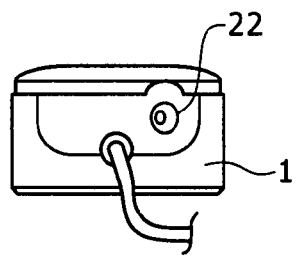
FIGS. 2A to 2D illustrate an appearance of a BT adapter according to this embodiment.
Figure 2A:
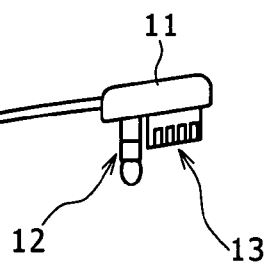
Figure 2B:
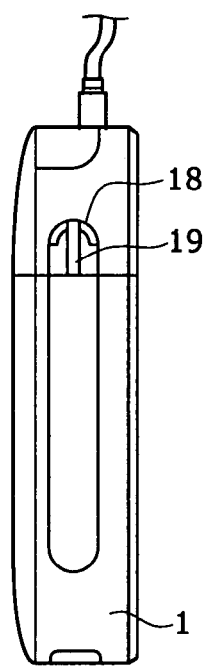
Figure 2D:
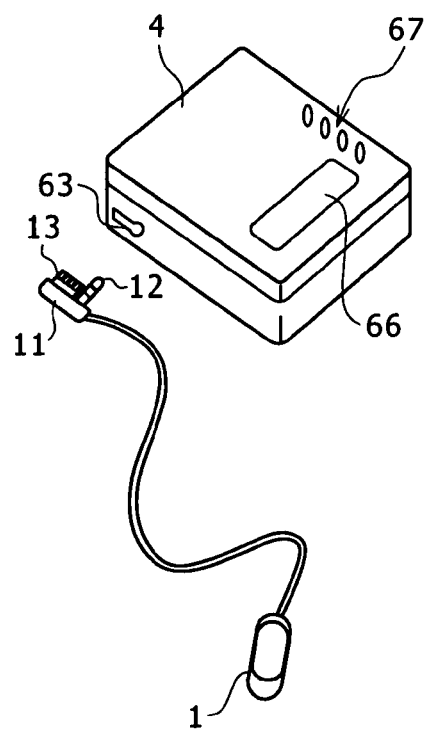

FIGS. 2A, 2B, and 2C are a plan view, a side view, and a top view, respectively, of the BT adapter 1. As is shown in these figures, a cord is attached to a top face of the BT adapter 1, and a connection terminal section 11 is provided at a tip of the cord. The connection terminal section 11 includes a plug portion 12 and a connector portion 13. As illustrated in FIG. 2D, the connection terminal section 11 is configured to be connected to a headphone/remote control terminal 63 of the portable audio player 4.

The headphone/remote control terminal 63 is a terminal to which a connection terminal section (i.e., which has the same shape and size as the connection terminal section 11) of a dedicated headphone/remote control for the audio player 4 is normally connected. As is known, the headphone/remote control is headphones that have at the middle of its cord a remote control with operation keys or the like for operating the audio player 4. That is, the BT adapter 1 is a device that can be connected to the headphone/remote control terminal 63 in place of the dedicated headphone/remote control.

The plug portion 12 has an L/R/common terminal and is used to transfer to the BT adapter 1 an L/R stereo analog audio signal outputted from the audio player 4.

The connector portion 13 has four terminals, for example. The four terminals correspond to a power line, a ground line, a command line, and a data line of the headphone/remote control terminal 63 of the audio player 4.

In the headphone/remote control terminal 63 of the audio player 4, these terminals for the power line, the ground line, the command line, and the data line are originally intended to be used when the headphone/remote control is connected to the audio player 4. Specifically, the power line and the ground line are used to supply power to the remote control of the headphone/remote control; the command line is used for input of a command signal from the remote control of the headphone/remote control; and the data line is used to transmit display data for a display section of the headphone/remote control.

While the BT adapter 1 according to the present embodiment has the connection terminal section 11 corresponding to the headphone/remote control terminal 63 so that the BT adapter 1 can be connected to the headphone/remote control terminal 63, the data line is not used, for example. Meanwhile, the command line is used to supply the command signal from the BT adapter 1 to the audio player 4.

Referring to FIG. 2C, the BT adapter 1 has an AC adapter terminal 22. When an AC adapter (not shown) is connected to the AC adapter terminal 22, an internal secondary battery can be charged. In addition, referring to FIG. 2A, the BT adapter 1 has a receiver reception section 25. If the BT receiver 2 is mounted on the receiver reception section 25 while the AC adapter is connected to the AC adapter terminal 22, a secondary battery inside the BT receiver 2 can also be charged at the same time.

Moreover, referring to FIGS. 2A and 2B, the BT adapter 1 also has a power button 19, which is used to turn on and off the power of the BT adapter 1, and a lighting section 18 that includes a light emitting diode (LED).

FIGS. 3A, 3B, 3C, 3D, and 3E are a plan view, a left side view, a right side view, a top view, and a bottom view, respectively, of the BT receiver 2.

The BT receiver 2 has a jack section 36. A plug (i.e., an L/R/common stereo plug) of the headphones 3 is connected to the jack section 36.

The BT receiver 2 also has operation keys such as a play key 40a, a stop key 40b, a cross key 40c, a +/− key 40d, a power key 40e, a hold key 40f, etc.

In addition, the BT receiver 2 has a semi-ring-shaped lighting window formed on a top face thereof, for example, and a lighting section 37 containing an LED is provided thereat.

Figure 5:
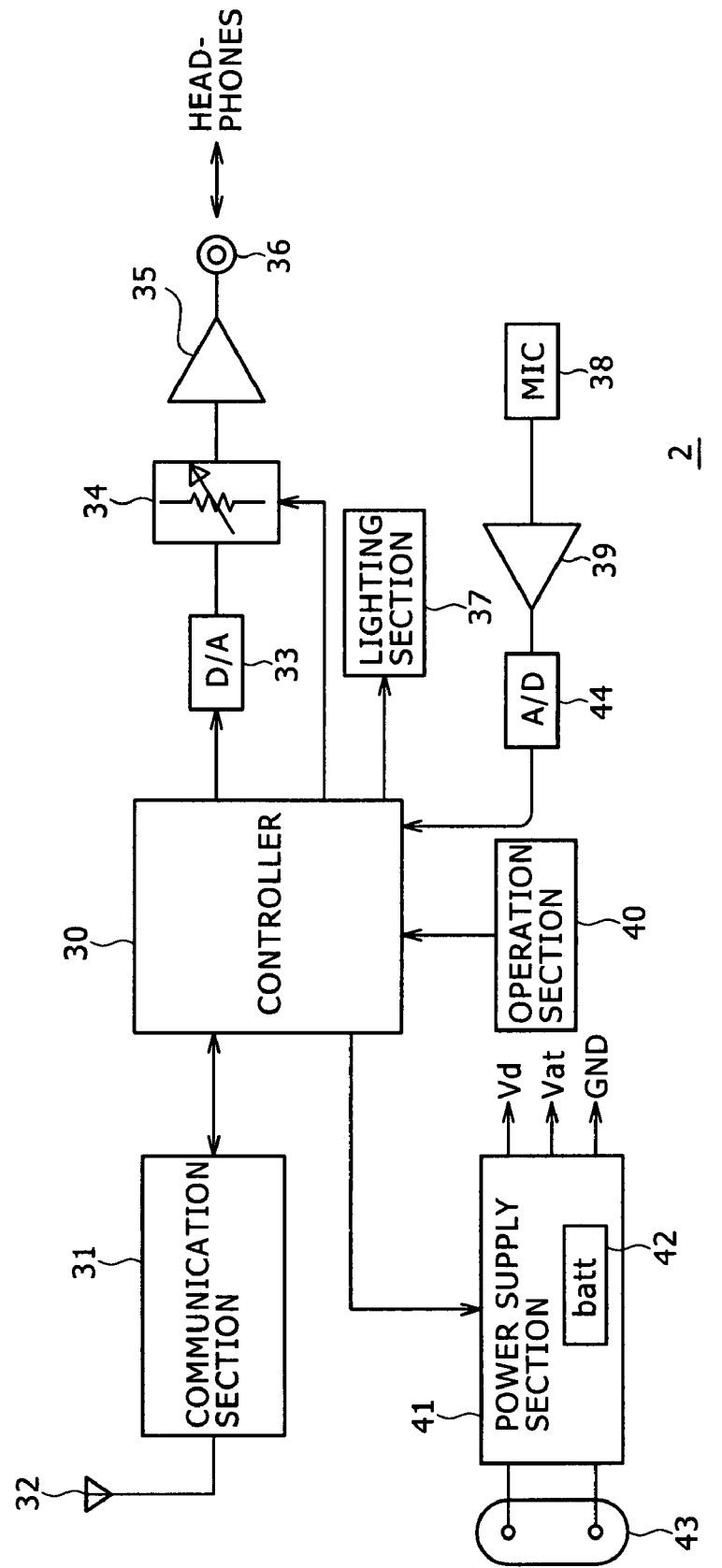
FIG. 5 is a block diagram of the BT receiver according to this embodiment.

The BT receiver 2 has a microphone hole 38a formed on a bottom face thereof. Deep inside the microphone hole is provided a built-in microphone (i.e., a microphone 38 as illustrated in FIG. 5, which will be described later).

2. Internal Structure of BT Adapter

Figure 4:
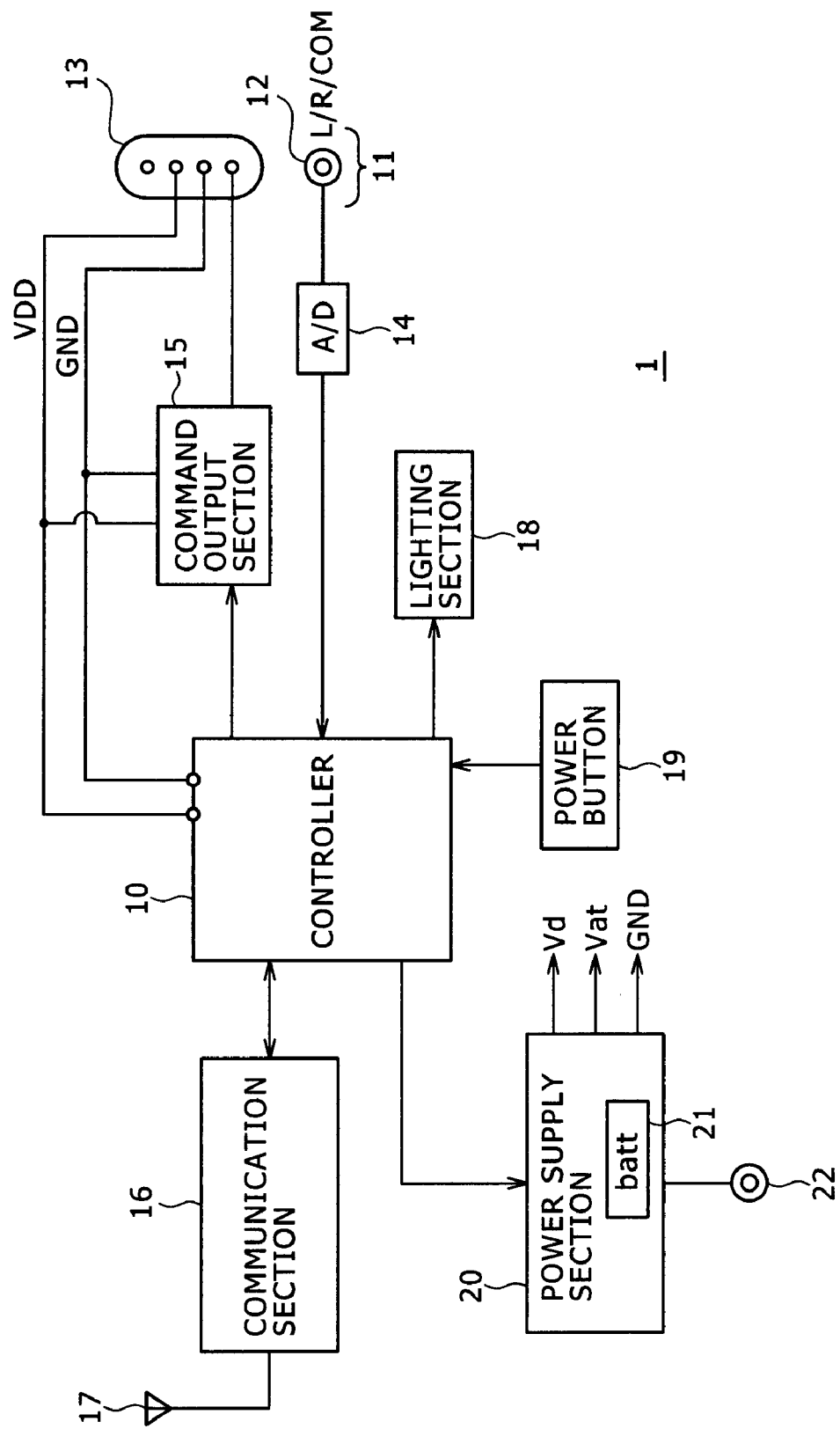
FIG. 4 is a block diagram of the BT adapter according to this embodiment.

FIG. 4 illustrates an exemplary internal structure of the BT adapter 1.

A controller 10 is formed by a microcomputer chip including a central processing unit (CPU), a read only memory (ROM), a random access memory (RAM), and an interface portion, and functions as a control section of the BT adapter 1. The controller 10 performs a Bluetooth communication process, power control, lighting control, control of output of the command to the audio player 4, and the like.

A communication section 16 performs an RF process and a baseband process to achieve wireless communication according to the Bluetooth system with another device via an antenna 17. The controller 10 performs the communication process using the AVDTP and the A2DP and achieves communication of stream data and control data with another device (e.g., the BT receiver 2) via the communication section 16.

As described above, the plug portion 12 of the connection terminal section 11 has the L/R/common terminal. The analog audio signal reproduced by the audio player 4 is inputted to the BT adapter 1 via the plug portion 12. The inputted analog audio signal is converted into a digital audio signal by an A/D converter 14, and the digital audio signal is inputted to the controller 10. The controller 10 encodes the inputted digital audio signal based on the A2DP to generate packets to be transmitted, and transmits the audio stream signal (i.e., the packets) to the other device (e.g., the BT receiver 2) via the communication section 16 and the antenna 17.

Moreover, regardless of whether stream line communication is being performed or whether the stream line is being closed, the controller 10 is able to perform the communication of the control data using the control line (AVDTP) with the other device (e.g., the BT receiver 2).

The lighting section 18 performs a lighting operation using the LED. The controller 10 supplies to the lighting section 18 a pulse signal as a lighting-driving signal for the LED. The controller 10 is capable of allowing the lighting section 18 to perform various modes of the lighting operation by varying a frequency or pulse duty of the pulse signal.

The modes of the lighting operation performed in the present embodiment include a "lighting operation for indicating streaming" and a "lighting operation for indicating the number of connected devices".

The lighting operation for indicating streaming is a lighting operation mode that is used while the transmission of the audio stream signal is being performed using the stream line (A2DP). In this lighting operation mode, gradual decrease and increase of brightness of light of the LED is repeated, for example. This lighting operation mode is achieved by gradually varying the pulse duty as the lighting-driving signal.

The lighting operation for indicating the number of connected devices is a lighting operation mode that is used while the communication using the stream line is not being performed (i.e., at the time of a power saving mode in the present embodiment, which will be described later), for example, and serves to indicate the number of communication-target devices. For example, when the number of communication-target devices is one, the LED is lighted once every four seconds, whereas when the number of communication-target devices is two, the LED is lighted twice every four seconds. The once-every-four-seconds lighting of the LED is achieved by supplying the pulse signal thereto so that the LED repeats 100 msec of lighting and 3900 msec of absence of lighting. The twice-every-four-seconds lighting of the LED is achieved by supplying the pulse signal thereto so that the LED repeats 100 msec of lighting, 100 msec of absence of lighting, 100 msec of lighting, and 3700 msec of absence of lighting.

Note that when no communication-target devices exist while the number of connected devices should be indicated, the lighting section 18 may not be lighted at all, or alternatively, the lighting section 18 may be lighted at longer intervals (e.g., lighted once every eight seconds) in order to indicate that there is no communication-target device but the power is on.

The controller 10 can count the number of connected devices (i.e., communication-target devices) in various manners. For example, the controller 10 can count the number of connected devices by distinguishing the connected devices by categories of communication systems used for connection (e.g., an audio category, a mobile phone category, etc.) or by distinguishing the connected devices by their addresses.

A power supply section 20 supplies an operation power supply voltage Vd to each part of the BT adapter 1 using a battery 21, which is a secondary or primary battery, as a power supply.

The controller 10 controls whether the power supply section 20 supplies the operation power supply voltage Vd, i.e., whether the power of the BT adapter 1 is on or off. The controller 10 carries out this power on/off control in accordance with an operation on the power button 19.

The power supply section 20 also includes a charging circuit. In the case where the battery 21 is a secondary battery, when the AC adapter is connected to the AC adapter terminal 22, the battery 21 can be charged using a charging current supplied via a DC power line. The charging current is obtained by rectifying and smoothing a commercial alternating current in the AC adapter.

When the power of the BT adapter 1 is off, the operation power supply voltage Vd is not supplied to any part of the BT adapter 1. However, while the power of the BT adapter 1 is off, a little current is supplied to the controller 10 by a standby power supply voltage Vst in order that the controller 10 can detect the operation of the power button 19 to turn on the power of the BT adapter 1.

A command output section 15 generates the command signal for the audio player 4, and supplies the command signal to one of the terminals of the connector portion 13 (i.e., the command line terminal). As described above, the plug portion 12 and the connector portion 13 of the connection terminal section 11 are similar to the connection terminal of the headphone/remote control for the audio player 4. Thus, the headphone/remote control terminal 63 of the audio player 4 naturally corresponds to the connection terminal section 11 of the BT adapter 1. In the case of the headphone/remote control, various command signals which, for example, correspond to various key operations by the user (e.g., a play command, a stop command, an FF (fast forward/cue) command, a REW (fast reverse/cue) command, etc.) are communicated to the audio player 4 in the form of differences in voltage value caused by resistor voltage dividers. Accordingly, the audio player 4 determines the content of a command based on the value of a voltage supplied to the command line terminal of the headphone/remote control terminal 63.

To achieve compatibility with this system, the command output section 15 is configured to supply a play command, a stop command, an FF command, a REW command, etc., to the command line terminal of the headphone/remote control terminal 63 in the form of differences in voltage value caused by resistor voltage dividers just as the headphone/remote control does.

In the case where the connection terminal section 11 is connected to the headphone/remote control terminal 63 of the audio player 4, the power line terminal and the ground line terminal of the connector portion 13 achieve connection with a power supply voltage line (VDD) and a ground line (GND), respectively, of the audio player 4.

The command output section 15 uses a plurality of resistors to divide a voltage between a power supply voltage VDD and a ground GND. The controller 10 selects a predetermined voltage dividing point in accordance with the content of a command to be outputted so that a voltage value according to the content of the command is supplied to the command line terminal.

In the present embodiment, each part of the BT adapter 1 operates by the operation power supply voltage Vd supplied from the power supply section 20, and does not use the power supply voltage VDD supplied from the audio player 4 as an operating voltage. However, in the present embodiment, the controller 10 is able to monitor the voltage between the power supply voltage VDD and the ground GND supplied from the audio player 4. Specifically, by monitoring the voltage between the power supply voltage VDD and the ground GND, the controller 10 is able to determine whether the audio player 4 is in a power-off state (i.e., a sleeping state) or in a power-on state. This means that the controller 10 is able to detect that the BT adapter 1 has been connected to the audio player 4 in the power-on state and that the BT adapter 1 has been disconnected from the audio player 4 in the power-on state.

3. Internal Structure of BT Receiver

Next, an exemplary internal structure of the BT receiver 2 will now be described below with reference to FIG. 5.

A controller 30 is formed by a microcomputer chip including a CPU, a ROM, a RAM, and an interface portion, and functions as a control section of the BT receiver 2. The controller 30 performs a Bluetooth communication process, power control, lighting control, control relating to the audio signal to be supplied to the headphones 3, and the like.

A communication section 31 performs an RF process and a baseband process to achieve wireless communication according to the Bluetooth system with another device via an antenna 32. The controller 30 performs a communication process using the AVDTP and the A2DP, for example, and achieves communication of the stream data and the control data with the other device (e.g., the BT adapter 1) via the communication section 31. In addition, the controller 30 performs a communication process using the HFP/HSP, for example, and is able to achieve communication of audio data of the telephone conversation and the control data in relation to another device (e.g., the mobile phone 5) via the communication section 31.

While the BT receiver 2 is communicating with the BT adapter 1 over the stream line using the A2DP, the audio stream signal reproduced by the audio player 4 is transmitted from the BT adapter 1 to the BT receiver 2. In this case, the controller 30 decodes the received audio stream signal and supplies the decoded digital audio signal to a D/A converter 33. The D/A converter 33 converts the digital audio signal into an analog audio signal (L/R stereo). This analog audio signal is subjected to volume adjustment in a volume adjustment section 34, then amplified in an amplifier section 35, and then supplied to the headphones 3 connected to the jack section 36 for audio output.

Moreover, regardless of whether the stream line communication is being performed or whether the stream line is being closed, the controller 30 is able to perform the communication of the control data with the other device (e.g., the BT adapter 1) over the control line (AVDTP).

The BT receiver 2 contains the built-in microphone 38. An audio signal of sound collected by the microphone 38 is amplified in a microphone amplifier 39 and then converted into a digital audio signal in an A/D converter 44, and the resulting digital audio signal is supplied to the controller 30.

When performing the communication process using the HFP/HSP in relation to the other device such as the mobile phone 5, the controller 30 is capable of encoding the digital audio signal and transmitting the encoded digital audio signal to the mobile phone 5 or the like via the communication section 31 and the antenna 32 as outgoing audio data for the telephone conversation, for example. As to incoming audio data transmitted from the mobile phone 5 or the like and received via the antenna 32 and the communication section 31, the controller 30 decodes the incoming audio data and supplies the decoded incoming audio data to the headphones 3 via the D/A converter 33, the volume adjustment section 34, and the amplifier section 35 so that the headphones 3 outputs sound based on the incoming audio data.

The lighting section 37 performs a lighting operation using the LED. The controller 30 supplies to the lighting section 37 a pulse signal as a lighting-driving signal for the LED. The controller 30 is capable of allowing the lighting section 37 to perform various modes of the lighting operation by varying a frequency or pulse duty of the pulse signal.

The modes of the lighting operation performed by the BT receiver 2 according to the present embodiment include a "lighting operation for indicating streaming" and a "lighting operation for indicating the number of connected devices", as with the above-described BT adapter 1. Moreover, while the telephone conversation is being performed via the mobile phone 5, the BT receiver 2 performs, as a telephone conversation indication, a lighting operation for indicating that the telephone conversation is being performed.

As with the case of the BT adapter 1, the lighting operation for indicating streaming is a lighting operation mode that is used while the transmission of the audio stream signal is being performed using the stream line (A2DP). In this lighting operation mode, gradual decrease and increase of brightness of light of the LED is repeated, for example. This lighting operation mode is achieved by gradually varying the pulse duty as the lighting-driving signal.

The lighting operation for indicating the number of connected devices is a lighting operation mode that is used while the communication using the stream line is not being performed (i.e., at the time of a power saving mode in the present embodiment, which will be described later), for example, and serves to indicate the number of communication-target devices. For example, when the number of communication-target devices is one (e.g., when the BT adapter 1 or the mobile phone 5 is only the communication-target device), the LED is lighted once every four seconds. Further, when the number of communication-target devices is two (e.g., the BT adapter 1 and the mobile phone 5), the LED is lighted twice every four seconds.

Similar to the controller 10 of the BT adapter 1, the controller 30 can achieve the once-every-four-seconds lighting of the LED by supplying the pulse signal thereto so that the LED repeats 100 msec of lighting and 3900 msec of absence of lighting. The controller 30 can achieve the twice-every-four-seconds lighting of the LED by supplying the pulse signal thereto so that the LED repeats 100 msec of lighting, 100 msec of absence of lighting, 100 msec of lighting, and 3700 msec of absence of lighting.

Note that when no communication-target devices exist while the number of connected devices should be indicated, the lighting section 37 may not be lighted at all, or alternatively, the lighting section 37 may be lighted at longer intervals (e.g., lighted once every eight seconds) in order to indicate that there is no communication-target device but the power is on.

The controller 30 can count the number of connected devices (i.e., communication-target devices) in various manners. For example, the controller 30 can count the number of connected devices by distinguishing the connected devices by categories of communication systems used for connection (e.g., the audio category, the mobile phone category, etc.) or by distinguishing the connected devices by their addresses.

The telephone conversation indication is realized by a different mode of lighting operation from the above-described lighting operation for indicating streaming or the above-described lighting operation for indicating the number of connected devices. For example, telephone conversation indication is realized by repeating 1 second of lighting and 1 second of absence of lighting.

An operation section 40 includes the various operation keys such as the play key 40a, the stop key 40b, the cross key 40c, the +/− key 40d, the power key 40e, the hold key 40f, etc., as illustrated in FIGS. 3A to 3C.

The controller 30 performs processes in accordance with the user's operation of the various operation keys of the operation section 40.

When an operation of the play key 40a is detected, the controller 30 transmits the play command to the BT adapter 1.

When an operation of the stop key 40b is detected, the controller 30 transmits the stop command to the BT adapter 1.

The cross key 40c can be used for an FF operation, a REW operation, and a volume up/down operation. When the FF operation, the REW operation, or the volume up/down operation using the cross key 40c is detected, the controller 30 transmits, to the BT adapter 1, the FF command, the REW command, or a volume up/down command, respectively, in accordance with the user operation.

Note that the transmission of such command signals is realized by the controller 30 of the BT receiver 2 and the controller 10 of the BT adapter 1 performing communication therebetween using the AVRCP (Audio/Video Remote Control Profile).

Upon receipt of the play command, the stop command, the FF command, the REW command, or the volume up/down command, the controller 10 of the BT adapter 1 supplies a predetermined voltage value to the audio player 4 via the command output section 15 in accordance with the received command.

The above-described operation enables the user to operate the audio player 4 using the BT receiver 2.

As to the volume up/down operation by use of the cross key 40c and an up/down operation by use of the +/− key 40d, the controller 30 may adjust the volume inside the BT receiver 2 by variable control of variable resistance of the volume adjustment section 34.

The play key 40a and the stop key 40b are also used for originating and answering a telephone call with the mobile phone 5. Upon detection of a long-pressing operation of the play key 40a, for example, the controller 30 recognizes this operation as an operation for originating a telephone call with the mobile phone 5, and transmits a call-originating command to the mobile phone 5. If the long-pressing operation of the play key is detected when the mobile phone 5 has received an incoming call, the controller 30 considers that the user has performed an operation for answering the call with the mobile phone 5, and proceeds to a process for telephone conversation using the BT receiver 2.

When a long-pressing operation of the stop key 40b is detected, the controller 30 recognizes this operation as an operation for terminating a telephone conversation (i.e., disconnecting a telephone call line), and performs a process for terminating the telephone conversation using the mobile phone 5.

When the hold key 40f is operated so that the controller 30 has shifted to a hold mode, the controller 30 ignores any operation of the various operation keys.

A power supply section 41 supplies an operation power supply voltage Vd to each part of the BT receiver 2 using a battery 42, which is a secondary or primary battery, as a power supply.

The controller 30 controls whether the power supply section 41 supplies the operation power supply voltage Vd, i.e., whether the power of the BT receiver 2 is on or off. The controller 30 carries out this power on/off control in accordance with an operation of the power key 40e on the operation section 40.

The power supply section 41 also includes a charging circuit, and when the BT receiver 2 is mounted on the receiver reception section 25 of the BT adapter 1, a charging terminal 43 is connected to the charging circuit in the BT adapter 1. In the case where the battery 42 is a secondary battery, the battery 42 can be charged by a current supplied from the AC adapter which is connected to the BT adapter 1 via the charging terminal 43.

When the power of the BT receiver 2 is off, the operation power supply voltage Vd is not supplied to any part of the BT receiver 2. However, while the power of the BT receiver 2 is off, a little current is supplied to the controller 30 by a standby power supply voltage Vst in order that the controller 30 can detect the operation of the power key 40e to turn on the power of the BT receiver 2.

4. Internal Structure of Audio Player

Figure 6:
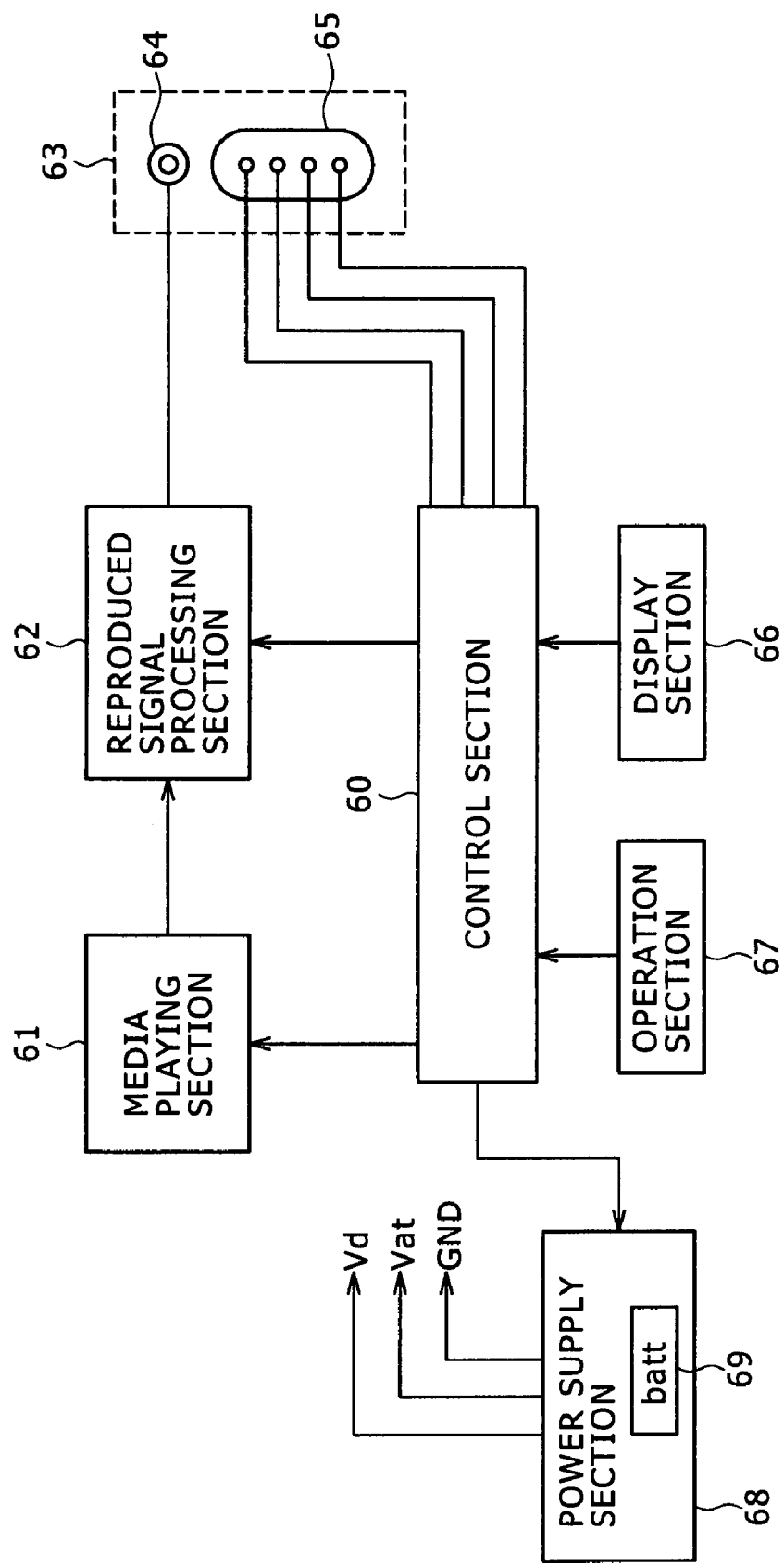
FIG. 6 is a block diagram of an audio player according to this embodiment.

Next, an exemplary internal structure of the audio player 4 will now be described below with reference to FIG. 6.

The audio player 4 uses a media playing section 61 to reproduce audio data from a specific recording medium. The media playing section 61 is formed by an optical disk player section, a tape player section, a memory card playing section, a built-in memory playing section, an HDD, or the like, for example.

In the case where the audio data is read from the recording medium in the media playing section 61, the audio data is subjected to a decoding process, an error correction process, a D/A conversion process, an analog signal processing, etc., in a "reproduced signal processing section" 62, and then, a resulting analog audio signal is supplied to a jack section 64 of the headphone/remote control terminal 63 to be outputted via the headphones.

The jack section 64 has an L/R/common terminal, and corresponds to the plug portion 12 of the connection terminal section 11 of the BT adapter 1 as well as the plug portion of the connection terminal section of the headphone/remote control of the same shape and size. When the BT adapter 1 is connected to the audio player 4, the above-described analog audio signal outputted from the reproduced signal processing section 62 is inputted to the BT adapter 1 via the jack section 64 and the plug portion 12 illustrated in FIG. 4.

An operation section 67 corresponds to the various keys provided on a housing of the audio player 4 for user operations as illustrated in FIG. 1. The display section 66 is a display formed on the housing as a liquid crystal panel or the like. The display section 66 is used, for example, to display an operation mode, the number of a track that is currently played, time information, etc.

A control section 60 is formed by a microcomputer including a CPU, a ROM, a RAM, and an interface portion, and controls the whole of the audio player 4. Specifically, the control section 60 performs an audio data reproduction operation in the media playing section 11, the processes in the reproduced signal processing section 62, a display operation in the display section 66, detection of any operation using the operation section 67, power state control, etc.

The headphone/remote control terminal 63 includes a connector jack section 65, which corresponds to the connector portion 13 of the BT adapter 1 and the connector portion of the headphone/remote control. By way of the connector jack section 65, the control section 60 achieves connection of the power line, the ground line, the command line, and the data line with the BT adapter 1 or the headphone/remote control. When the BT adapter 1 or the headphone/remote control is connected to the audio player 4, the control section 60 is able to detect the command signal (e.g., the play command, the stop command, etc.) supplied from the BT adapter 1 or the headphone/remote control by detecting the voltage value in the command line connected at the connector jack section 65.

A power supply section 68 supplies an operation power supply voltage Vdd to each part of the audio player 4 using a battery 69, which is a secondary or primary battery, as a power supply.

The control section 60 controls whether the power supply section 68 supplies the operation power supply voltage Vdd, i.e., whether the power of the audio player 4 is on or off. The control section 60 turns on the power of the audio player 4 when the user uses the operation section 67 to carry out a play operation, for example. The control section 60 also turns on the power of the audio player 4 when the play command is supplied from the BT adapter 1 or the like connected to the audio player 4 via the connector jack section 65.

When the user uses the operation section 67 to carry out a stop operation or when the stop command is supplied from the BT adapter 1 or the like connected to the audio player 4 via the connector jack section 65, the control section 60 stops reproduction in response thereto and, if no user operation is performed for a predetermined time period, the control section 60 turns off the power of the audio player 4 to control the audio player 4 to enter the sleeping state.

Note that the sleeping state refers to a state in which while the operation power supply voltage Vdd is off, a little current is being supplied to the control section 60 using the standby power supply voltage Vst so that the control section 60 can at least detect any user operation or command.

5. Procedure Performed by BT Adapter

Hereinafter, as operations according to the present embodiment, processes performed by the BT adapter 1 and the BT receiver 2 will be described sequentially. Thereafter, exemplary operations realized by the processes performed by the BT adapter 1 and the BT receiver 2 will be described.

First, referring to FIG. 7, a procedure performed by the controller 10 after the power of the BT adapter 1 is turned on will now be described below.

Figure 7:
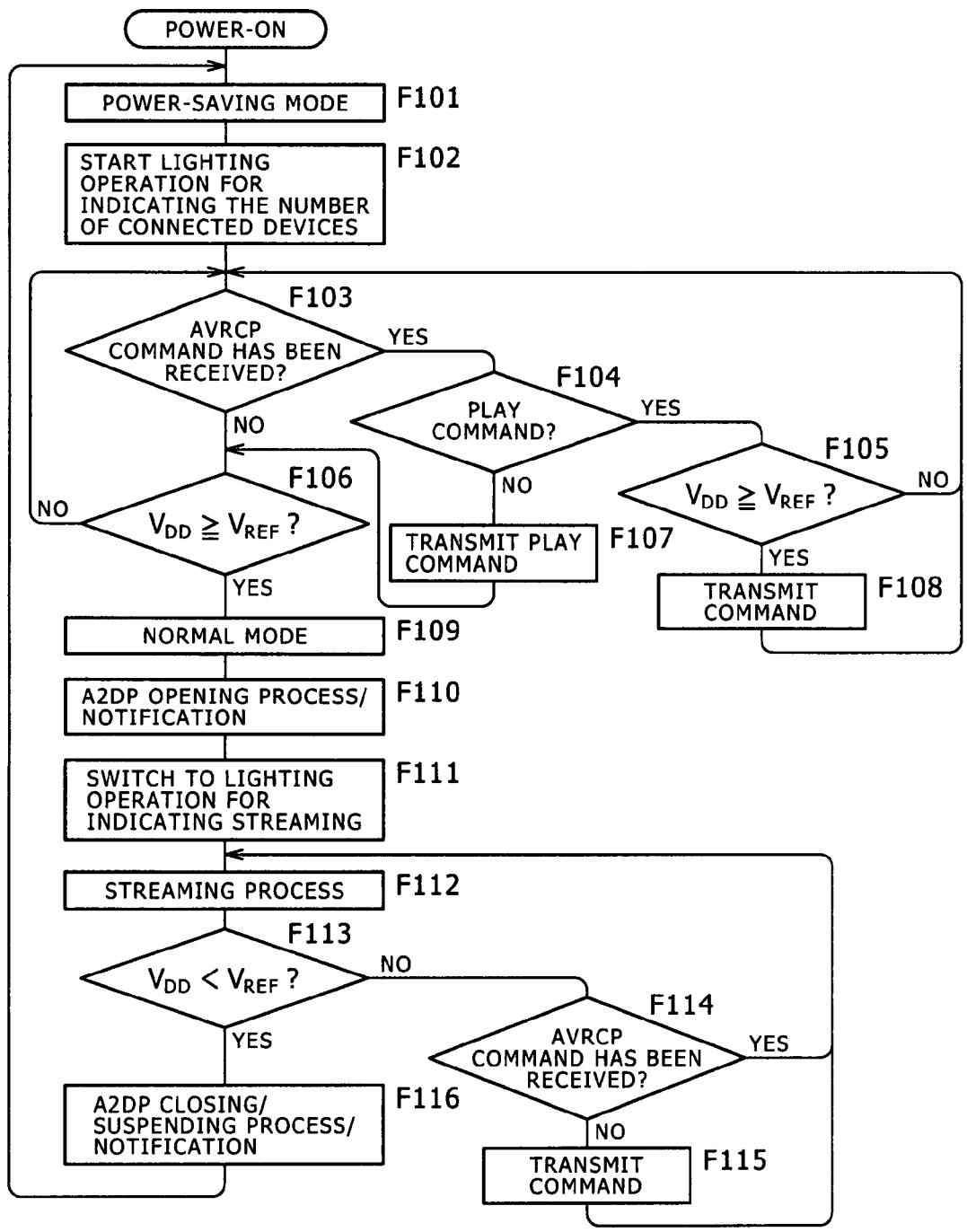
FIG. 7 is a flowchart of a procedure performed by the BT adapter according to this embodiment.

When the user operates the power button 19, the controller 10 performs a power turn-on process to start the procedure of FIG. 7. First, at step F101, the controller 10 starts to operate in the power saving mode. The power saving mode refers to an operation mode in which while the stream line using the A2DP is closed, the communication over the control line using the AVDTP and the communication of the command using the AVRCP are performed intermittently. In the case of the BT adapter 1, for example, a mode known as a "sniff mode" in which packets of the control data are communicated at predetermined intervals can be adopted as the power saving mode.

The communication over the stream line using the A2DP involves increased power consumption of the BT adapter 1. The power consumption differs considerably depending on whether the A2DP is open for communication or whether the communication is being suspended. Therefore, the power saving mode stays in a state that the communication using the A2DP be being suspended.

After starting to operate in the power saving mode, the controller 10 allows the lighting section 18 to start the above-described lighting operation for indicating the number of connected devices at step F102. If the communication is being performed with only the BT receiver 2, for example, the controller 10 drives the LED in the lighting section 18 to light once every four seconds.

While in the power saving mode, the controller 10 monitors whether the command signal has been received from the BT receiver 2 in the communication using the AVRCP at step F103.

At step F106, the controller 10 checks the state of a terminal voltage (i.e., the voltage between VDD and GND) supplied to the connector portion 13 connected to the audio player 4, and monitors whether or not the voltage VDD supplied from the audio player 4 is equal to or greater than a reference voltage VRFF. The audio player 4 supplies a predetermined voltage VDD to the external device via the connector jack section 65 while the power of the audio player 4 is on. Therefore, if the voltage VDD is equal to or greater than the reference voltage VREF, it is determined that the audio player 4 of which the power is on is being connected to the BT adapter 1. On the other hand, if the voltage VDD is lower than the reference voltage VREF, it is determined that the power of the connected audio player 4 is off (i.e., in the sleeping state) or the audio player 4 is not connected to the BT adapter 1.

If reception of the AVRCP command is detected at step F103, the controller 10 proceeds to step F104, at which the controller 10 determines whether the received command is the play command. In the present embodiment, commands that can be transmitted from the BT receiver 2 include the play command (which also serves as a power turn-on command), the stop command, the FF command, the REW command, and the volume up/down command.

If the received command is not the play command, control proceeds to step F105, at which the terminal voltage state (the voltage between VDD and GND) is compared with the reference voltage VRFF to determine whether the audio player 4 of which the power is on is currently connected to the BT adapter 1.

If the terminal voltage state satisfies VDD<VREF, i.e., the audio player 4 is in the sleeping state or the audio player 4 is not currently connected to the BT adapter 1, any of the stop command, the FF command, the REW command, and the volume up/down command is a useless command; therefore, control returns to step F103 without transmitting the command.

On the other hand, if VDD≧VREF, i.e., the audio player 4 is in operation, then control proceeds to step F108, at which the controller 10 controls the command output section 15 to output a command signal corresponding to the received AVRCP command to the audio player 4. For example, in the case where the stop key 40b has been operated at the BT receiver 2 and the stop command has been transmitted therefrom as the AVRCP command, the controller 10 controls the command output section 15 to output the stop command in the form of a voltage signal. In response thereto, the audio player 4 stops the reproduction.

If it is determined at step F104 that the received AVRCP command is the play command, control proceeds to F107, at which the controller 10 controls the command output section 15 to output the play command to the audio player 4.

At the audio player 4, the control section 60 detects the play command and, if the audio player 4 is in the sleeping state at the time, the control section 60 performs a power turn-on process and starts the audio data reproduction operation using the media playing section 61 and the reproduced signal processing section 62.

After transmitting the play command, the controller 10 proceeds to step F106 and checks the terminal voltage state. At this time, even if the audio player 4 had been in the sleeping state before the transmission of the play command, the terminal voltage state satisfies VDD≧VREF as a result of the operation of the audio player 4 in response to the play command.

After recognizing from the terminal voltage state that the power of the audio player 4 is on, the controller 10 proceeds to step F109.

Note that, even without the transmission of the play command, VDD≧VREF may be recognized at step F106. For example, when the connection terminal section 11 is connected to the audio player 4 in operation or when the power of the BT adapter 1 is turned on while the power of the audio player 4 is on, VDD≧VREF will be recognized at step F106. In such a case also, control proceeds to step F109

At step F109, the operation mode shifts from the power saving mode to a normal mode. Then, at step F110, an A2DP opening process (i.e., a process of opening the A2DP) is performed in relation to the stream line, and an A2DP opening notification (i.e., notification of the opening of the A2DP) is issued to the BT receiver 2 over the control line.

In response to the opening of the stream line, the controller 10 allows the lighting section 18 to start the above-described lighting operation for indicating streaming at step F111.

Then, at step F112, the controller 10 performs a streaming process. Specifically, when the audio player 4 starts the reproduction in response to the play command (or while the audio player 4 is performing the reproduction), the audio stream signal reproduced at the audio player 4 is supplied to the BT adapter 1. As the streaming process at step F112, the controller 10 performs a process of transmitting the audio stream signal supplied from the audio player 4 to the BT receiver 2 over the stream line.

During the streaming process, the controller 10 performs monitoring processes at steps F113 and F114. At step F113, the controller 10 monitors whether the terminal voltage state satisfies VDD<VREF. The terminal voltage state satisfies VDD<VREF when the power of the audio player 4 has been turned off or when the connection terminal section 11 has been removed from the audio player 4 to terminate the connection therebetween. If the terminal voltage state satisfies VDD≧VREF, the streaming process is in a normal condition, and the streaming process is allowed to continue.

At step F114, the controller 10 monitors whether any AVRCP command has been received from the BT receiver 2. If any AVRCP command has been received, the controller 10 proceeds to step F115, at which the controller 10 controls the command output section 15 to output a command signal corresponding to the received AVRCP command to the audio player 4.

Specifically, in accordance with the user operation using the BT receiver 2, the FF command, the REW command, the volume up/down command, the stop command, or the like is transmitted to the audio player 4.

At the audio player 4, the control section 60 performs an FF operation, a REW operation, a volume process, a stop process, or the like in accordance with the command. In the case where the control section 60 has performed the stop process in accordance with the stop command, the control section 60 performs a process of entering the sleeping state (i.e., the power-off state) after a predetermined time (e.g., 10 seconds) elapses.

When the user uses the operation section 67 of the audio player 4 to carry out the stop operation, the audio player 4 performs the stop process and, after the predetermined time elapses, enters the sleeping state.

Meanwhile, when the user uses the BT receiver 2 to carry out the stop operation, the stop command is transmitted from the BT adapter 1 to the audio player 4 as described above, and the audio player 4 performs the stop process and, after the predetermined time elapses, enters the sleeping state.

Further, if no user operation is performed for a predetermined time after the reproduction is completed (e.g., after all tunes have been reproduced), the audio player 4 enters the sleeping state.

Still further, when the battery 69 of the audio player 4 is exhausted, the power of the audio player 4 is turned off.

In the above cases or in the case where the connection between the BT adapter 1 and the audio player 4 has been terminated, it is detected at step F113 that the terminal voltage state satisfies VDD<VREF, and then control proceeds to step F116.

At step F116, the controller 10 performs a closing process or a suspending process in relation to the stream line using the A2DP, and transmits a closing/suspending notification to the BT receiver 2. The closing process refers to a process of closing the stream line using the A2DP, whereas the suspending process refers to a process of suspending the communication over the stream line while keeping the A2DP open. Both the closing process and the suspending process are processes for suspending the communication over the stream line.

When the communication over the stream line has been suspended, the controller 10 returns to step F101 and returns to the power saving mode.

6. Procedure Performed by BT Receiver

Next, referring to FIG. 8, processes performed by the controller 30 of the BT receiver 2 will now be described below.

Figure 8:
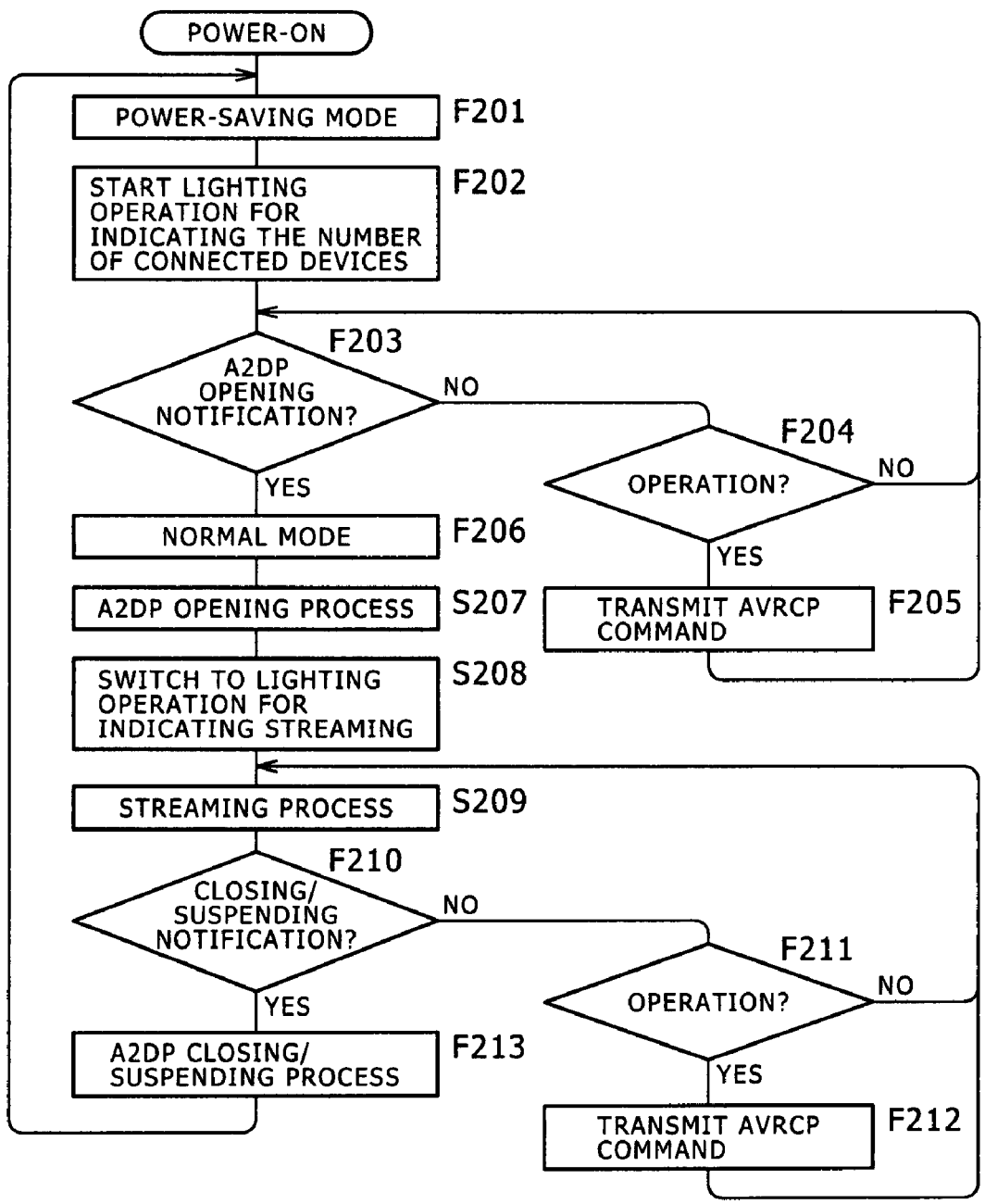
FIG. 8 is a flowchart of a procedure performed by the BT receiver according to this embodiment.

When the user operates the power key 40e, the controller 30 performs a power turn-on process to start a procedure as illustrated in FIG. 8. First, at step F201, the controller 30 starts to operate in the power saving mode. The power saving mode refers to an operation mode in which the stream line using the A2DP is closed. In the power saving mode, the communication of the control data with the BT adapter 1 using the control line based on the AVDTP, the communication of the command signal using the AVRCP, and the communication of the control data with the mobile phone 5 using the HSP/HFP are performed.

After starting to operate in the power saving mode, the controller 30 allows the lighting section 37 to start the above-described lighting operation for indicating the number of connected devices at step F202. When the BT receiver 2 is communicating with the BT adapter 1 and the mobile phone 5, for example, the controller 30 drives the LED of the lighting section 37 to light twice every four seconds.

In the power saving mode, the controller 30 performs monitoring processes at steps F203 and F204. At step F203, the controller 30 monitors whether the A2DP opening notification has been issued from the BT adapter 1 over the control line.

At step F204, the controller 30 monitors whether the user has carried out any user operation. The user operation at this time is any of a play operation by means of the play key 40a, a stop operation by means of the stop key 40b, and an FF operation, a REW operation, and a volume up/down operation by means of the cross key 40c. If any of these operations is detected, the controller 30 proceeds to step F205, at which the controller 30 performs a process of transmitting a command signal corresponding to the detected operation to the BT adapter 1 using the AVRCP.

If the A2DP opening notification is received from the BT adapter 1 at step F203, the controller 30 proceeds to step F206, at which the controller 30 shifts to a normal mode. The normal mode refers to an operation mode in which a normal communication operation is performed in relation to the BT adapter 1 over the control line and the stream line. Then, at step F207, the controller 30 performs an A2DP opening process.

As the controller 30 has shifted to the normal mode, opening the stream line, the controller 30 allows the lighting section 37 to start the above-described lighting operation for indicating streaming at step F208.

At step F209, the controller 30 performs a streaming process. As described above, the BT adapter 1 transmits the audio stream signal reproduced in the audio player 4 to the BT receiver 2 in the streaming process of step F112 as illustrated in FIG. 7. Meanwhile, the controller 30 of the BT receiver 2 performs a reception process and a demodulating/decoding process for the audio stream signal, etc., as the streaming process of step F209, and performs a process of supplying the resulting analog audio signal to the headphones 3 via the jack section 36.

As a result, the user is able to listen to the music or the like played by the audio player 4 via the headphones 3.

During the streaming process, the controller 30 performs monitoring processes at steps F210 and F211. At step F210, the controller 30 monitors whether the notification of the closing of the A2DP or the suspending of the communication over the stream line has been issued from the BT adapter 1 over the control line.

At step F211, the controller 30 monitors whether the user has performed any user operation. The user operation at this time is any of the play operation by means of the play key 40a, the stop operation by means of the stop key 40b, and the FF operation, the REW operation, and the volume up/down operation by means of the cross key 40c. If any of these operations is detected, the controller 30 proceeds to step F212, at which the controller 30 performs a process of transmitting a command signal corresponding to the detected operation to the BT adapter 1 using the AVRCP.

If it is detected at step F210 that the notification of the closing of the A2DP stream line or the suspending of the communication over the stream line has been issued from the BT adapter 1, the controller 30 proceeds to F213, at which the controller 30 performs a closing process or suspending process for the A2DP. Then, the controller 30 returns to step F201.

7. Exemplary Operations

Exemplary operations achieved by the above-described processes performed by the BT adapter 1 and the BT receiver 2 will now be described below with reference to FIGS. 9 to 15. These exemplary operations are, in particular, operations in the case where the processes are performed in accordance with the terminal voltage state at the connection terminal section 11 where the BT adapter 1 is connected to the audio player 4.

Figure 9:
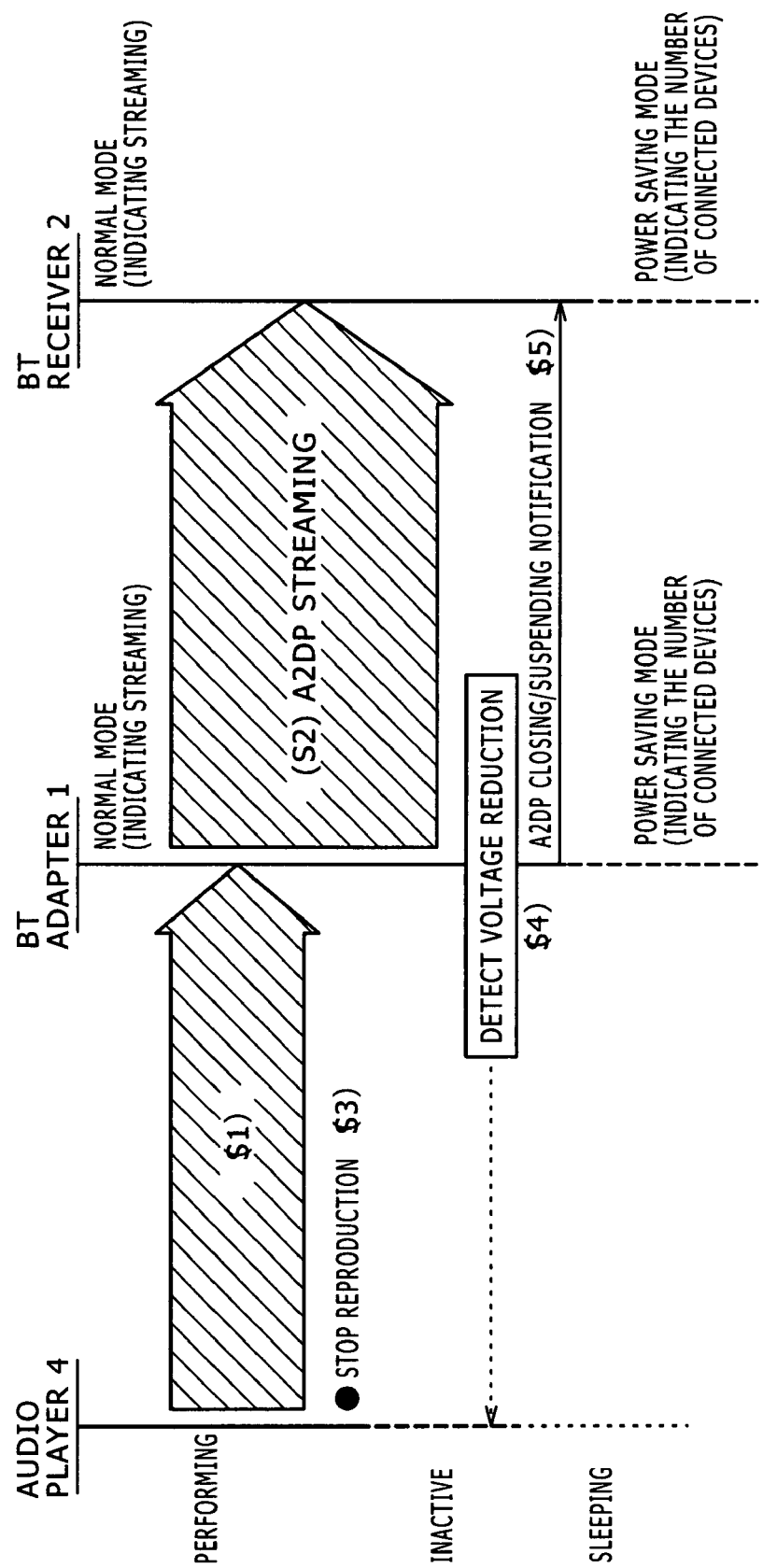
FIG. 9 is a diagram illustrating an exemplary operation according to this embodiment in the case where reproduction is stopped.

FIG. 9 illustrates an exemplary operation in the case where while the BT adapter 1 is performing the process of step F112 as illustrated in FIG. 7 and the BT receiver 2 is performing the process of step F209 as illustrated in FIG. 8 (i.e., while both the BT adapter 1 and the BT receiver 2 are performing the streaming process), the reproduction is stopped in the audio player 4. Operations are denoted by (S1) to (S5). In addition, with respect to each of the operations, a step number(s) of a corresponding process(es) as illustrated in FIG. 7 (which illustrates the procedure performed by the BT adapter 1) and FIG. 8 (which illustrates the procedure performed by the BT receiver 2) is shown.

(S1): The audio stream signal is reproduced from the audio player 4 and supplied to the BT adapter 1.

(S2): As a process in the normal mode, the BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

(S3): The reproduction is stopped in the audio player 4. This operation corresponds to any of the following cases: a case where the user carries out the stop operation using the operation section 67 of the audio player 4 so that a reproduction stop process is performed; a case where the user carries out the stop operation using the BT receiver 2, and accordingly the stop command is transmitted from the BT adapter 1 to the audio player 4 so that the reproduction stop process is performed (F212 and F115); or a case where the reproduction is completed so that the audio player 4 automatically enters an inactive state. After the stop of the reproduction, the audio player 4 enters the sleeping state if no user operation is performed for the predetermined time.

(S4): When the predetermined time (e.g., approximately 10 seconds) elapses after the stop of the reproduction and the audio player 4 enters the sleeping state, the BT adapter 1 detects that the voltage VDD supplied from the audio player 4 has been reduced, i.e., that the audio player 4 has entered the power-off (sleeping) state (F113).

(S5): The BT adapter 1 performs the closing process or suspending process for the A2DP, issues the notification thereof to the BT receiver 2, and shifts to the power saving mode (F116→F101). In response to the closing or suspending notification, the BT receiver 2 also performs the closing process or the suspending process, and shifts to the power saving mode (F213→F201). Thereafter, the lighting section 18 of the BT adapter 1 and the lighting section 37 of the BT receiver 2 perform the lighting operation for indicating the number of connected devices.

Figure 10:
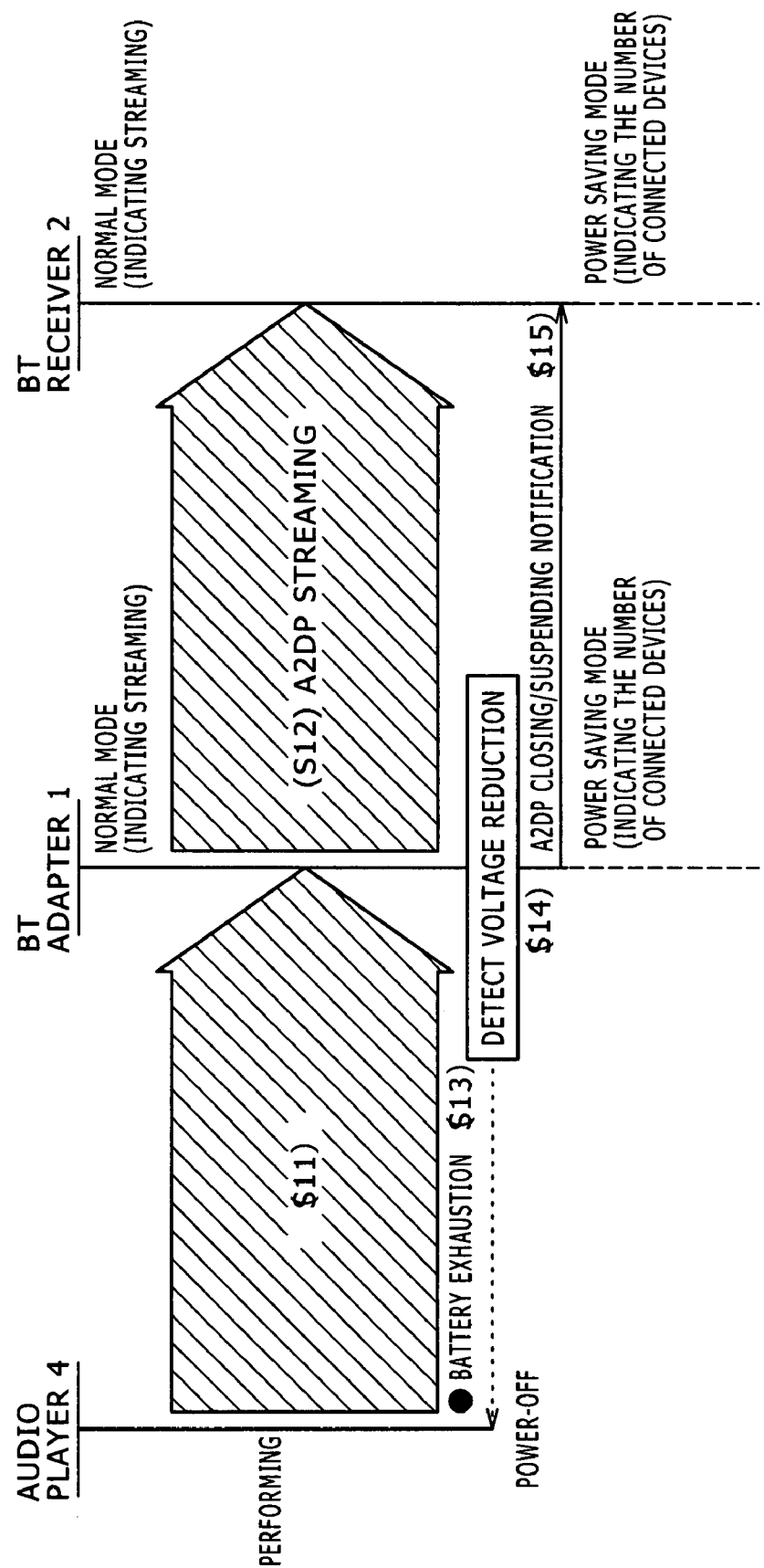
FIG. 10 is a diagram illustrating an exemplary operation according to this embodiment in the case where a battery is exhausted.

Next, FIG. 10 illustrates an exemplary operation in the case where the battery of the audio player 4 is exhausted during the streaming process. Operations are denoted by (S11) to (S15).

(S11): The audio stream signal is reproduced from the audio player 4 and supplied to the BT adapter 1.

(S12): As a process in the normal mode, the BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

(S13): The battery of the audio player 4 is exhausted so that the reproduction is stopped and the power of the audio player 4 is turned off.

(S14): As a result of the turn-off of the power of the audio player 4, the BT adapter 1 detects that the voltage VDD supplied from the audio player 4 has been reduced (F113).

(S15): The BT adapter 1 performs the closing process or suspending process for the A2DP, issues the notification thereof to the BT receiver 2, and shifts to the power saving mode (F116→F101). In response to the closing or suspending notification, the BT receiver 2 also performs the closing process or the suspending process, and shifts to the power saving mode (F213→F201). Thereafter, the lighting section 18 of the BT adapter 1 and the lighting section 37 of the BT receiver 2 perform the lighting operation for indicating the number of connected devices.

Figure 11:
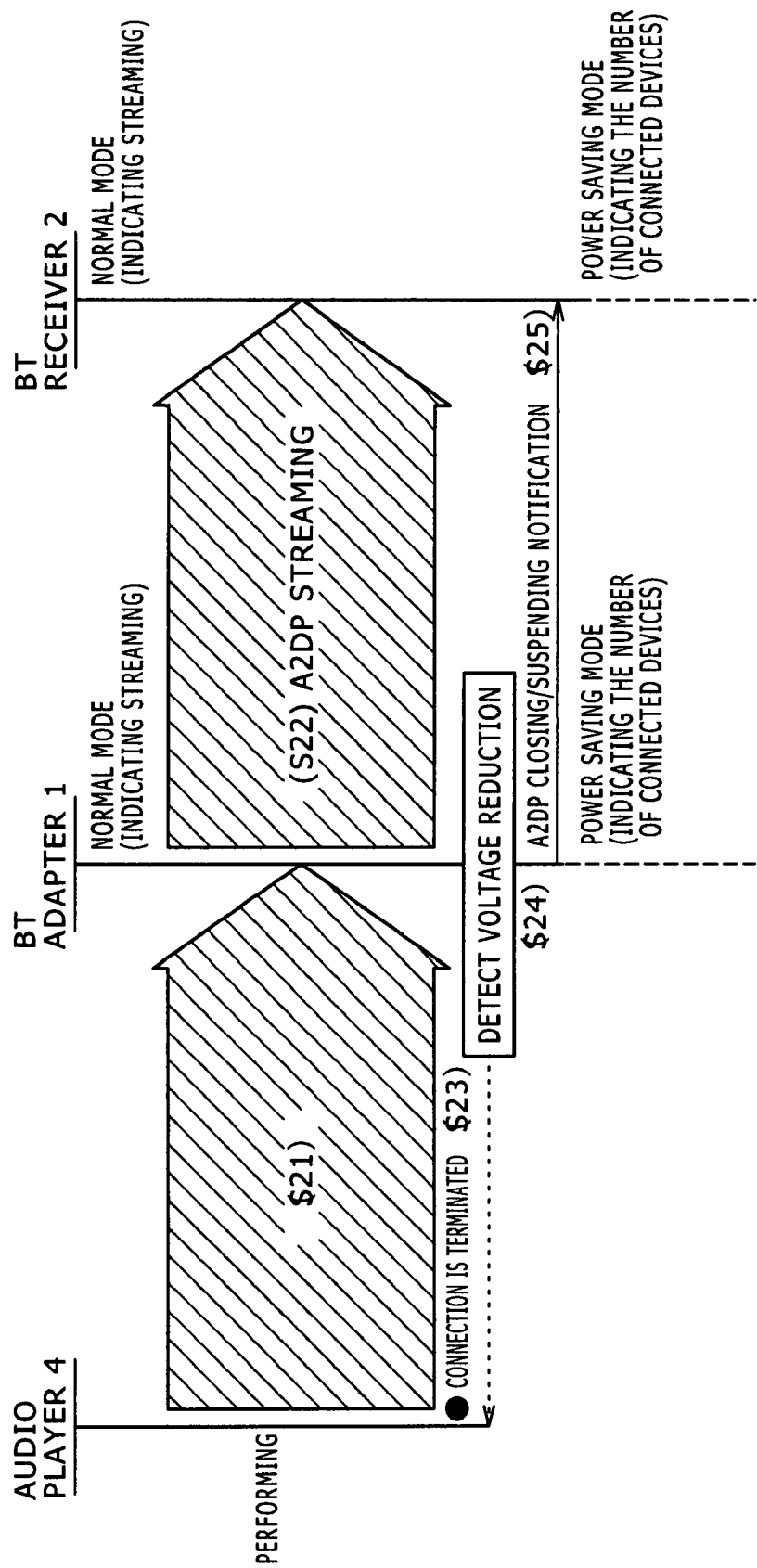
FIG. 11 is a diagram illustrating an exemplary operation according to this embodiment in the case where connection is terminated.

FIG. 11 illustrates an exemplary operation in the case where during the streaming process, the connection between the audio player 4 and the BT adapter 1 is terminated. Operations are denoted by (S21) to (S25).

(S21): The audio stream signal is reproduced from the audio player 4 and supplied to the BT adapter 1.

(S22): As a process in the normal mode, the BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

(S23): The connection terminal section 11 of the BT adapter 1 is removed from the audio player 4 so that the connection therebetween is terminated.

(S24): As a result of the termination of the connection, the BT adapter 1 detects the reduction in the voltage VDD (F113).

(S25): The BT adapter 1 performs the closing process or suspending process for the A2DP, issues the notification thereof to the BT receiver 2, and shifts to the power saving mode (F116→F101). In response to the closing or suspending notification, the BT receiver 2 performs the closing process or the suspending process, and shifts to the power saving mode (F213→F201). Thereafter, the lighting section 18 of the BT adapter 1 and the lighting section 37 of the BT receiver 2 perform the lighting operation for indicating the number of connected devices.

Figure 12:
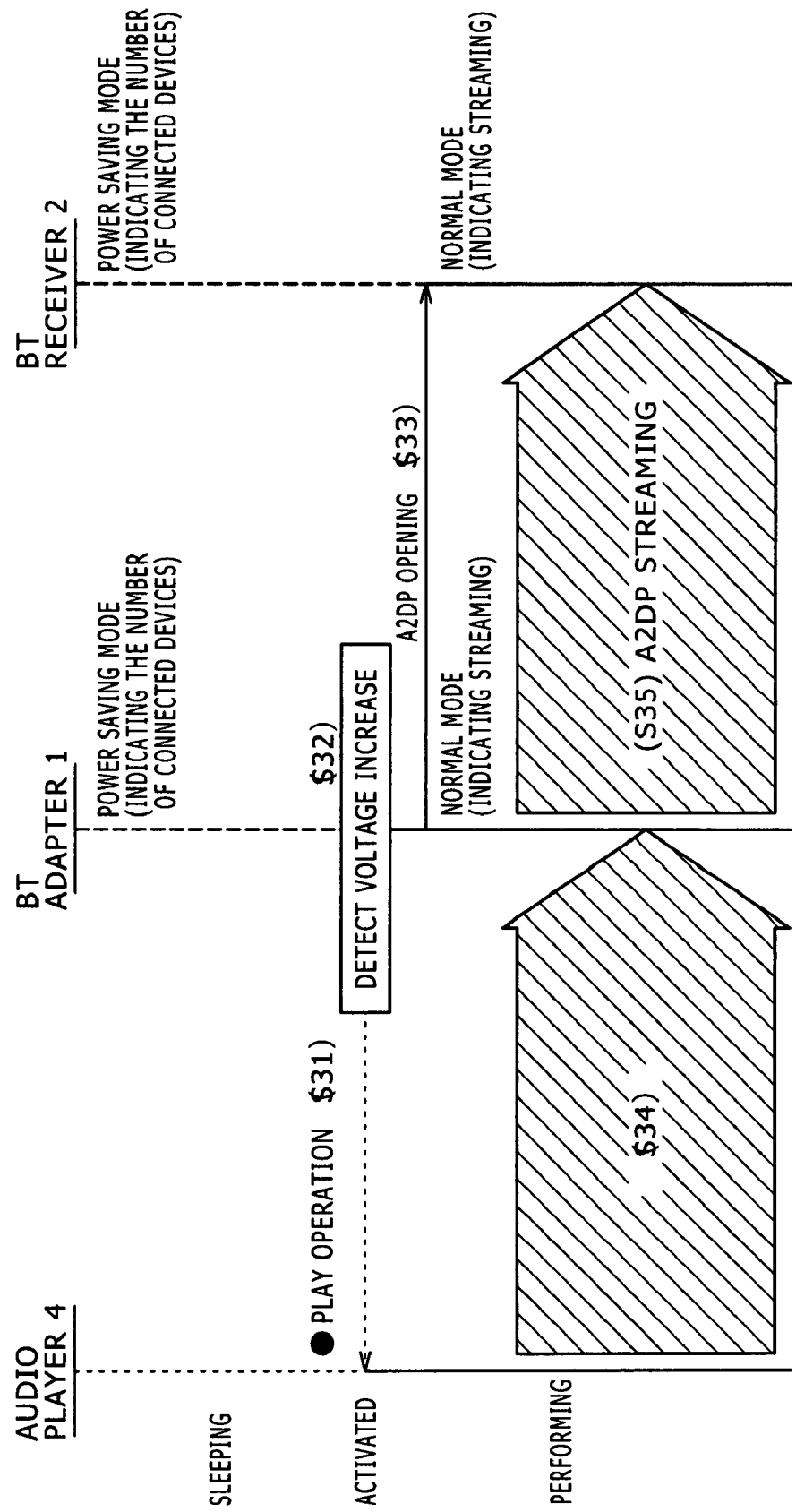
FIG. 12 is a diagram illustrating an exemplary operation according to this embodiment in the case where a play operation is performed.

FIG. 12 illustrates an exemplary operation in the case where while the audio player 4 is in the sleeping state and the BT adapter 1 and the BT receiver 2 are in the power saving mode, the audio player 4 is activated. Operations are denoted by (S31) to (S35).

(S31): The play operation is carried out to turn on the power of the audio player 4, and the reproduction is started. The play operation in this case is the play operation performed by the user using the operation section 67 of the audio player 4.

(S32): Due to the increase in the voltage VDD, the BT adapter 1 detects that the power of the audio player 4 has been turned on to start the reproduction (F106).

(S33): The BT adapter 1 shifts to the normal mode to perform the A2DP opening process, and issues the A2DP opening notification to the BT receiver 2 (F109 and F110). In response to the A2DP opening notification, the BT receiver 2 shifts to the normal mode to perform the A2DP opening process (F203, F206, and F207).

(S34): The audio stream signal is reproduced from the audio player 4 and supplied to the BT adapter 1.

(S35): The BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

Figure 13:
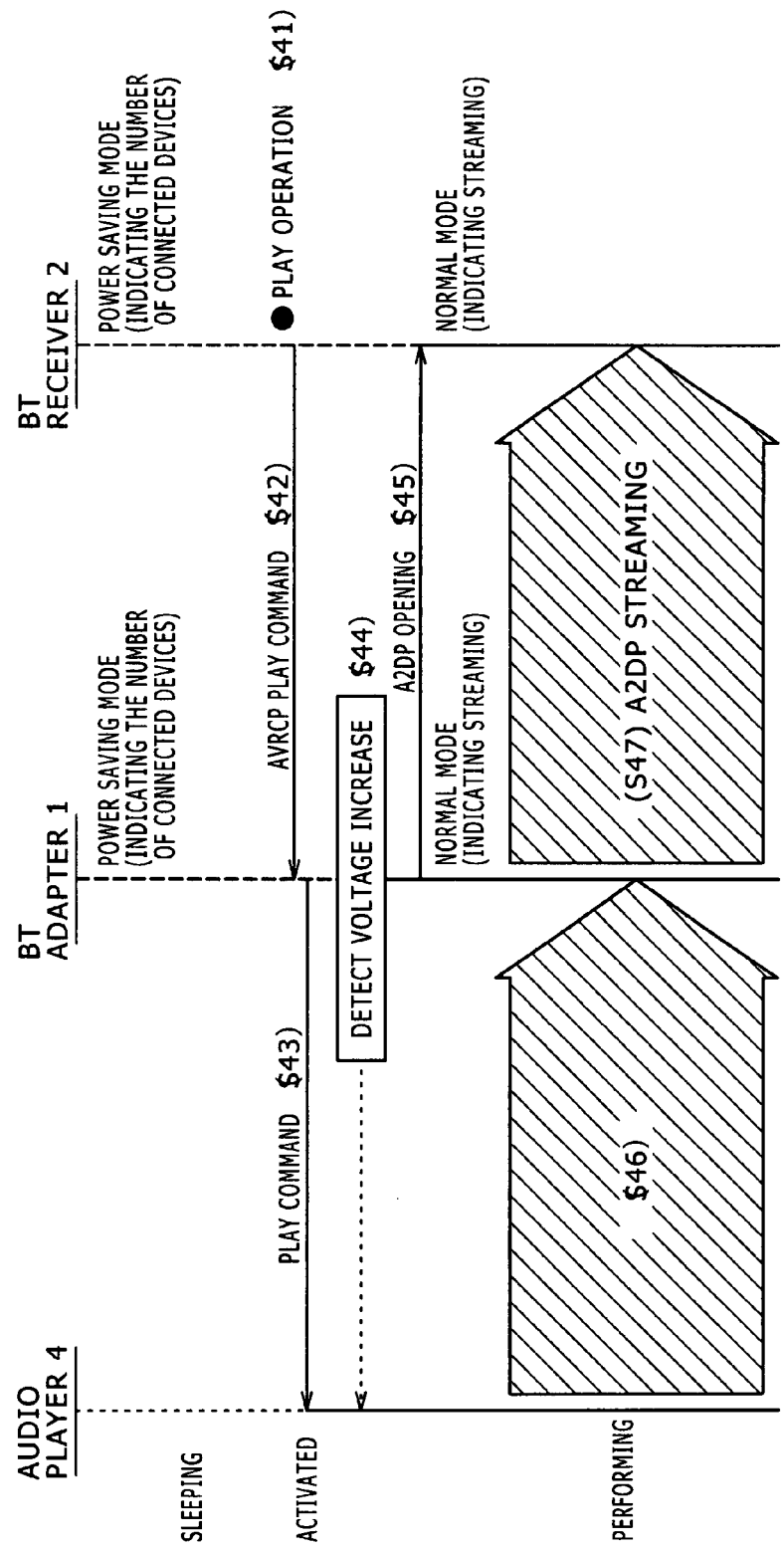
FIG. 13 is a diagram illustrating an exemplary operation according to this embodiment in the case where a play operation is performed using the BT receiver.

FIG. 13 illustrates another exemplary operation in the case where while the audio player 4 is in the sleeping state and the BT adapter 1 and the BT receiver 2 are in the power saving mode, the audio player 4 is activated. Operations are denoted by (S41) to (S47).

(S41): The user operates the play key 40a of the BT receiver 2.

(S42): In response to the operation of the play key 40a, the BT receiver 2 transmits the play command to the BT adapter 1 using the AVRCP (F205).

(S43): In response to the play command, the BT adapter 1 transmits the play command from the command output section 15 to the audio player 4 (F107). In response to the play command, the audio player 4 turns on the power to start the reproduction.

(S44): Due to the increase in the voltage VDD, the BT adapter 1 detects that the power of the audio player 4 has been turned on to start the reproduction (F106).

(S45): The BT adapter 1 shifts to the normal mode to perform the A2DP opening process, and issues the A2DP opening notification to the BT receiver 2 (F109 and F110). In response to the A2DP opening notification, the BT receiver 2 shifts to the normal mode to perform the A2DP opening process (F203, F206, and F207).

(S46): The audio stream signal is reproduced from the audio player 4 and supplied to the BT adapter 1.

(S47): The BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

Figure 14:
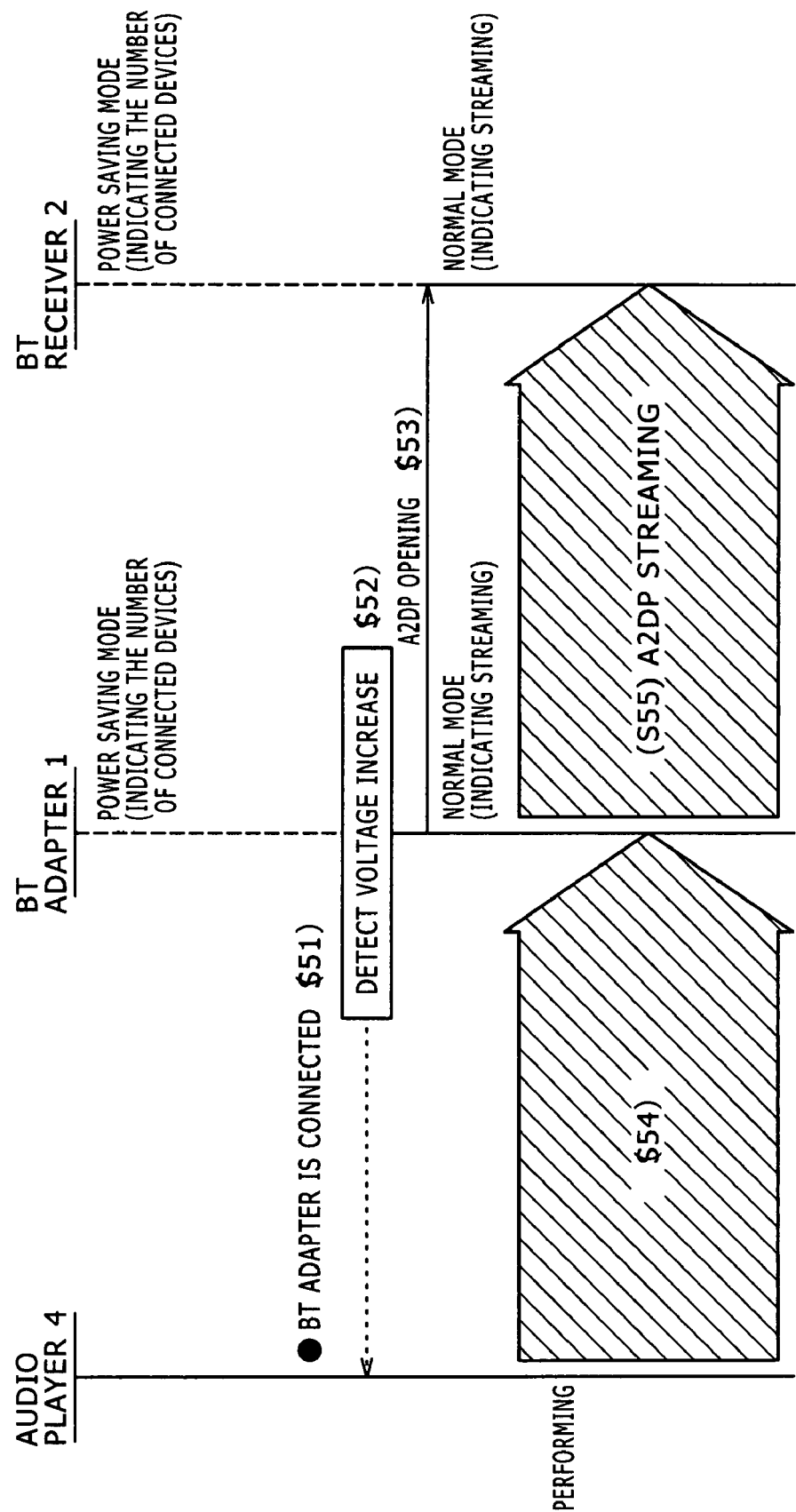
FIG. 14 is a diagram illustrating an exemplary operation according to this embodiment in the case where the BT adapter is connected to the audio player.

FIG. 14 is an exemplary operation in the case where while the audio player 4 is performing the reproduction, the BT adapter 1 is connected to the audio player 4. It is assumed that both the BT adapter 1 and the BT receiver 2 have been in the power saving mode until the connection. Operations will be dented by (S51) to (S55).

(S51): While the audio player 4 is performing the reproduction, the connection terminal section 11 of the BT adapter 1 is connected to the headphone/remote control terminal 63 of the audio player 4.

(S52): By detecting the increase in the voltage VDD, the BT adapter 1 detects that the audio player 4 in operation is being connected thereto (F106).

(S53): The BT adapter 1 shifts to the normal mode to perform the A2DP opening process, and issues the A2DP opening notification to the BT receiver 2 (F109 and F110). In response to the A2DP opening notification, the BT receiver 2 shifts to the normal mode to perform the A2DP opening process (F203, F206, and F207).

(S54): The audio stream signal being reproduced in the audio player 4 is supplied to the BT adapter 1.

(S55): The BT adapter 1 transmits the audio stream signal supplied from the audio player 4 to the BT receiver 2 over the stream line using the A2DP. As a process in the normal mode, the BT receiver 2 receives the audio stream signal transmitted over the stream line, and performs the process of outputting the sound based on the audio stream signal via the headphones 3 (F112 and F209). During this operation, the lighting section 18 of the BT adapter 1 and the lighting section 37 of the BT receiver 2 perform the lighting operation for indicating streaming.

Figure 15:
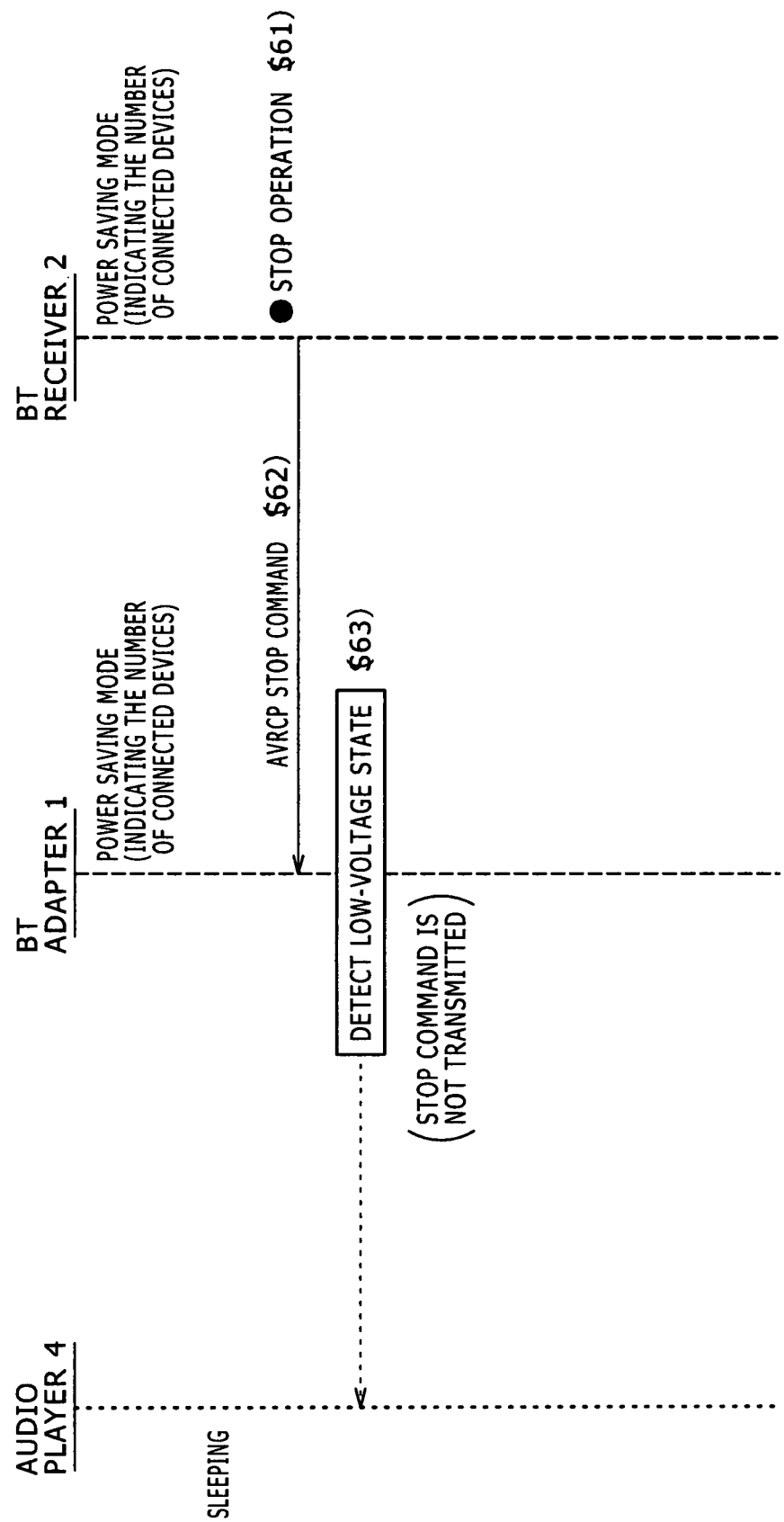
FIG. 15 is a diagram illustrating an exemplary operation according to this embodiment in the case where a stop operation is performed using the BT receiver.

FIG. 15 illustrates an exemplary case where while the audio player 4 is in the sleeping state, the user operates the stop key 40b of the BT receiver 2. Both the BT adapter 1 and the BT receiver 2 are in the power saving mode. Operations are denoted by (S61) to (S63).

(S61): The user operates the stop key 40b of the BT receiver 2.

(S62): In response to the operation of the stop key 40b, the BT receiver 2 transmits the stop command using the AVRCP (F205).

(S63): Upon receipt of the stop command, the BT adapter 1 checks the voltage VDD. If the audio player 4 is in the sleeping state at this time, it is detected that the voltage VDD is lower than the reference voltage VRFF. In this case, the stop command is not transmitted to the audio player 4 (F103→F104→F105→F103).

8. Effects of Embodiment

One embodiment of the present invention has been described above. This embodiment has the following effects.

In the BT adapter 1, the controller 10 monitors the terminal voltage VDD supplied from the audio player 4 to the connector portion 13 to detect the operating state (i.e., the power state) of the audio player 4 or whether the audio player 4 is connected to the BT adapter 1, and accordingly carries out appropriate control. For example, if while the streaming process is being performed, the power of the audio player 4 is turned off or the connection between the audio player 4 and the BT adapter 1 is terminated, the controller 10 terminates the streaming process and notifies the BT receiver 2 of the termination of the streaming process.

When the power of the audio player 4 has been turned off or when the connection between the audio player 4 and the BT adapter 1 has been terminated, the streaming process becomes a useless operation. Therefore, terminating the streaming process in accordance with the state of the audio player 4 contributes greatly to the reduction in the power consumption of the BT adapter 1 and the BT receiver 2. In addition, this relieves the user of the need to worry about the power consumption of the BT adapter 1 and the BT receiver 2.

Moreover, even when the BT adapter 1 is in the power saving mode, the controller 10 can detect the power turn-on and the start of the reproduction of the audio player 4 based on the terminal voltage VDD to start the streaming process and allow the BT receiver 2 to also start the streaming process. This also serves to realize an appropriate system operating state that meets the user's purpose.

The BT receiver 2 is usable as a remote control for the audio player 4. When any other operation than the play operation is performed using the BT receiver 2, the command is not supplied to the audio player 4 unless the power of the audio player 4 is on (performing the reproduction). For example, even if the stop key 40b of the BT receiver 2 is operated while the audio player 4 in the sleeping state, the BT adapter 1 does not supply the stop command to the audio player 4. This serves to avoid an unnecessary operation of supplying the useless command to the audio player 4 in the sleeping state to make the audio player 4 active temporarily.

While in the power saving mode, the BT adapter 1 and the BT receiver 2 use the lighting sections 18 and 37, respectively, to indicate the number of devices with which they can communicate. This enables the user to recognize that the connection is maintained for communication or the number of connected devices.

While performing the streaming process, the BT adapter 1 and the BT receiver 2 use the lighting sections 18 and 37, respectively, to perform the lighting operation for indicating streaming (i.e., a different mode of lighting from that performed in the power saving mode). This enables the user to recognize that the BT receiver 2 and the BT adapter 1 are currently performing the streaming operation and that the BT receiver 2 and the BT adapter 1 are currently operating in a high power consumption mode.

The above lighting operations by the LEDs of the lighting sections 18 and 37 function as substitutes for display of an operating state using a liquid crystal panel or the like. Using the LEDs of the lighting sections 18 and 37 instead of the liquid crystal panel or the like contributes to the reduction in size and production cost of the BT adapter 1 and the BT receiver 2.

The present invention is not limited to the above-described embodiment, but various modifications are conceivable.

The structures (see FIGS. 2, 3, 4, and 5) and procedures (see FIGS. 7 and 8) of the BT adapter 1 and the BT receiver 2, which are first and second communication apparatuses according to one embodiment of the present invention, are simply meant to be illustrative examples. It should be understood that various modifications are possible.

Note that a signal output apparatus that outputs the stream signal and to which the BT adapter 1 or the like as a communication apparatus (i.e., the first communication apparatus) is connected may not necessarily be the portable audio player 4. Other examples of such a signal output apparatus include a stationary audio player and devices that output an audio signal and/or a video signal obtained from television broadcasting, radio broadcasting, network distribution, or the like.

Also note that a device to which the BT receiver 2 or the like as the second communication apparatus is connected may not necessarily be the headphones 3. Other examples of such a device include a loudspeaker and an image display.

What is claimed is:

1. A communication apparatus, comprising:
   a communication processing section configured to perform wireless communication of a stream signal over a stream line with another communication apparatus;
   a signal input section configured to input the stream signal outputted from a connected signal output apparatus;
   a voltage detection section configured to detect a voltage of the signal output apparatus;
   a command output section configured to output a command signal to the signal output apparatus; and
   a control section configured to perform a streaming process of transmitting the stream signal inputted from the signal output apparatus via said signal input section to the other communication apparatus over the stream line, and also determine whether or not to transmit the command signal via said command output section based on the voltage detected by said voltage detection section and a content of the command signal to be transmitted when an occasion to transmit the command signal to the signal output apparatus via said command output section arises,
   wherein the voltage detected by said voltage detection section is a voltage at a power supply terminal of the signal output apparatus, the power supply terminal being used to supply power to an external device other than the communication apparatus.

2. The communication apparatus according to claim 1, wherein said communication processing section further performs wireless communication of control data over a control line.

3. The communication apparatus according to claim 1, wherein, based on the result of the detection by said voltage detection section, said control section performs control of switching an operating state between a normal mode and a power saving mode.

4. The communication apparatus according to claim 1, wherein, if the voltage detected by said voltage detection section has fallen below a predetermined value when the streaming process is being performed, said control section performs a process of terminating the streaming process.

5. The communication apparatus according to claim 4, wherein, when terminating the streaming process, said control section performs a process of notifying the other communication apparatus of the termination of the streaming process.

6. The communication apparatus according to claim 1, wherein, if the voltage detected by said voltage detection section has fallen below a predetermined value when the streaming process is being performed with an operating state being a normal mode, said control section performs a process of terminating the streaming process and switching the operating state to a power saving mode.

7. The communication apparatus according to claim 1, wherein, if the voltage detected by said voltage detection section has risen above a predetermined value, said control section performs a process of starting the streaming process.

8. The communication apparatus according to claim 7, wherein, when starting the streaming process, said control section performs a process of notifying the other communication apparatus of the start of the streaming process.

9. The communication apparatus according to claim 1, wherein, if the voltage detected by said voltage detection section has risen above a predetermined value when an operating state is a power saving mode, said control section performs a process of switching the operating state to a normal mode and starting the streaming process.

10. The communication apparatus of claim 1 wherein the stream signal comprises an audio stream signal.

11. The communication apparatus of claim 10 wherein the signal output apparatus comprises an audio player.

12. The communication apparatus of claim 11 wherein the content of the command signal comprises a play command.

13. The communication apparatus of claim 11 wherein the content of the command signal comprises a stop command.

14. A communication system, comprising:
a communication processing unit configured to perform wireless communication of a stream signal over a stream line with another communication apparatus;
a signal output unit configured to output the stream signal;
a signal input unit configured to input the stream signal output from the signal output unit;
a voltage detection section configured to detect a voltage of the signal output unit;
a command output unit configured to output a command signal to the signal output unit; and
a control unit configured to perform a streaming process of transmitting the stream signal inputted from the signal output unit via said signal input unit to the other communication apparatus over the stream line, and also determine whether or not to transmit the command signal via said command output unit based on the voltage detected by said voltage detection unit and a content of the command signal to be transmitted when an occasion to transmit the command signal to the signal output unit via said command output unit arises, wherein
the voltage detected by said voltage detection unit is a voltage at a power supply terminal of the signal output unit, the power supply terminal being used to supply power to an external device other than the communication system.

15. The communication system of claim 14 wherein the stream signal comprises an audio stream signal.

16. The communication system of claim 15 wherein the signal output unit comprises an audio player.

17. The communication system of claim 16 wherein the content of the command signal comprises a play command.

18. The communication system of claim 16 wherein the content of the command signal comprises a stop command.

19. A communication apparatus, comprising:
communication processing means configured to perform wireless communication of a stream signal over a stream line with another communication apparatus; signal input means configured to input the stream signal outputted from a connected signal output apparatus;
a command output means configured to output a command signal to the signal output apparatus;
voltage detection means configured to detect a voltage of the signal output apparatus; and
control means configured to perform a streaming process of transmitting the stream signal inputted from the signal output apparatus via said signal input means to the other communication apparatus over the stream line, and also perform operation control based on a result of the detection by said voltage detection means,
wherein the voltage detected by said voltage detection means is a voltage at a power supply terminal of the signal output apparatus, the power supply terminal for supplying power to an external device other than the communication apparatus, and
wherein when an occasion to transmit the command signal to the signal output apparatus via said command output means arises, said control means determines whether or not to transmit the command signal via said command output means based on the voltage detected by said voltage detection means and a content of the command signal to be transmitted.

20. The communication apparatus of claim 19 further comprising the signal output apparatus.

21. The communication apparatus of claim 20 wherein the signal output apparatus comprises an audio player.

* * * * *